( 12 ) United States Patent
Yano et al.

(10) Patent No.: US 8,203,722 B2
(45) Date of Patent: Jun. 19, 2012

(54) IMAGE PROCESSING APPARATUS, IMAGE FORMING APPARATUS, AND OUTPUT-FORMAT SETTING METHOD

(75) Inventors: Takashi Yano, Tokyo (JP); Yoshifumi Sakuramata, Tokyo (JP); Tetsuya Sakayori, Tokyo (JP); Iwao Saeki, Kanagawa (JP); Junichi Takami, Kanagawa (JP); Hiroko Mano, Tokyo (JP); Takanori Nagahara, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1026 days.

(21) Appl. No.: 12/153,305

(22) Filed: May 16, 2008

(65) Prior Publication Data

US 2008/0309956 A1   Dec. 18, 2008

(30) Foreign Application Priority Data

Jun. 14, 2007   (JP) .................. 2007-157839

(51) Int. Cl.
G06K 15/00 (2006.01)
G06K 9/34 (2006.01)
G06F 17/00 (2006.01)
(52) U.S. Cl. ...... 358/1.12; 358/1.17; 715/209; 715/221; 715/255; 382/180
(58) Field of Classification Search ............... 358/1.12, 358/1.13, 1.15–1.18, 1.9, 452, 527; 382/180; 715/209, 221, 243, 249, 251, 253, 255
See application file for complete search history.

(56) References Cited

U.S. PATENT DOCUMENTS

| 2007/0070472 | A1 | 3/2007 | Kato et al. |
| 2007/0070473 | A1 | 3/2007 | Lu et al. |
| 2007/0086073 | A1* | 4/2007 | Horiuchi ................ 358/527 |
| 2007/0115491 | A1 | 5/2007 | Kato et al. |
| 2007/0133015 | A1 | 6/2007 | Saeki et al. |
| 2007/0133073 | A1 | 6/2007 | Shida et al. |
| 2007/0139707 | A1 | 6/2007 | Takami et al. |
| 2007/0139741 | A1 | 6/2007 | Takami et al. |
| 2007/0140723 | A1 | 6/2007 | Saeki et al. |
| 2007/0143671 | A1* | 6/2007 | Paterson et al. ............ 715/527 |
| 2007/0157084 | A1 | 7/2007 | Yano et al. |
| 2008/0030523 | A1 | 2/2008 | Takami et al. |

FOREIGN PATENT DOCUMENTS

JP   2006-003568   1/2006

* cited by examiner

*Primary Examiner* — James A Thompson
(74) *Attorney, Agent, or Firm* — Harness, Dickey & Pierce

(57) ABSTRACT

An image-information obtaining unit obtains image information. A form determining unit determines form information indicating a characteristic of limiting a position of a viewing axis that is an axis for turning over a page a print on which the image information is printed, based on the image information. A viewing-axis determining unit determines the position of the viewing axis based on the form information. A format limiting unit limits format information that can be set according to the position of the viewing axis. A format receiving unit receives an input of the format information limited by the format limiting unit.

17 Claims, 21 Drawing Sheets

FIG. 2

| | | | | | | | | |
|---|---|---|---|---|---|---|---|---|
| DOUBLE-SIDED FLAG: F1 | 0 | 0 | 1 | 0 OR 1 | 0 OR 1 | 1 | 1 | 0 OR 1 |
| TOP AND BOTTOM FLAG: F2 | 0 | 0 | 0 | 0 | 0 | 0 | 1 | 0 OR 1 |
| VERTICAL WRITING FLAG: F3 | 0 | 1 | 0 | 0 | 1 | 1 | 0 OR 1 | 0 OR 1 |
| LEFT PUNCH FLAG: F4 | 0 | 0 | 0 OR 1 | 1 | 0 | 0 | 0 | 0 |
| UPPER PUNCH FLAG: F5 | 0 | 0 | 0 | 0 | 0 | 0 | 0 OR 1 | 1 |
| RIGHT PUNCH FLAG: F6 | 0 | 0 | 0 | 0 | 1 | 0 | 0 | 0 |
| POSITION OF VIEWING AXIS | LEFT OBLIQUE | RIGHT OBLIQUE | LEFT | LEFT | RIGHT | RIGHT | TOP | TOP |

FIG. 9

| POSITION OF VIEWING AXIS | STAPLER | PUNCH | ... |
|---|---|---|---|
| LEFT OBLIQUE | LEFT OBLIQUE | NONE | ... |
| RIGHT OBLIQUE | RIGHT OBLIQUE | NONE | ... |
| LEFT | LEFT OBLIQUE OR LEFT | LEFT | ... |
| RIGHT | RIGHT OBLIQUE OR RIGHT | RIGHT | ... |
| TOP | TOP | TOP | ... |

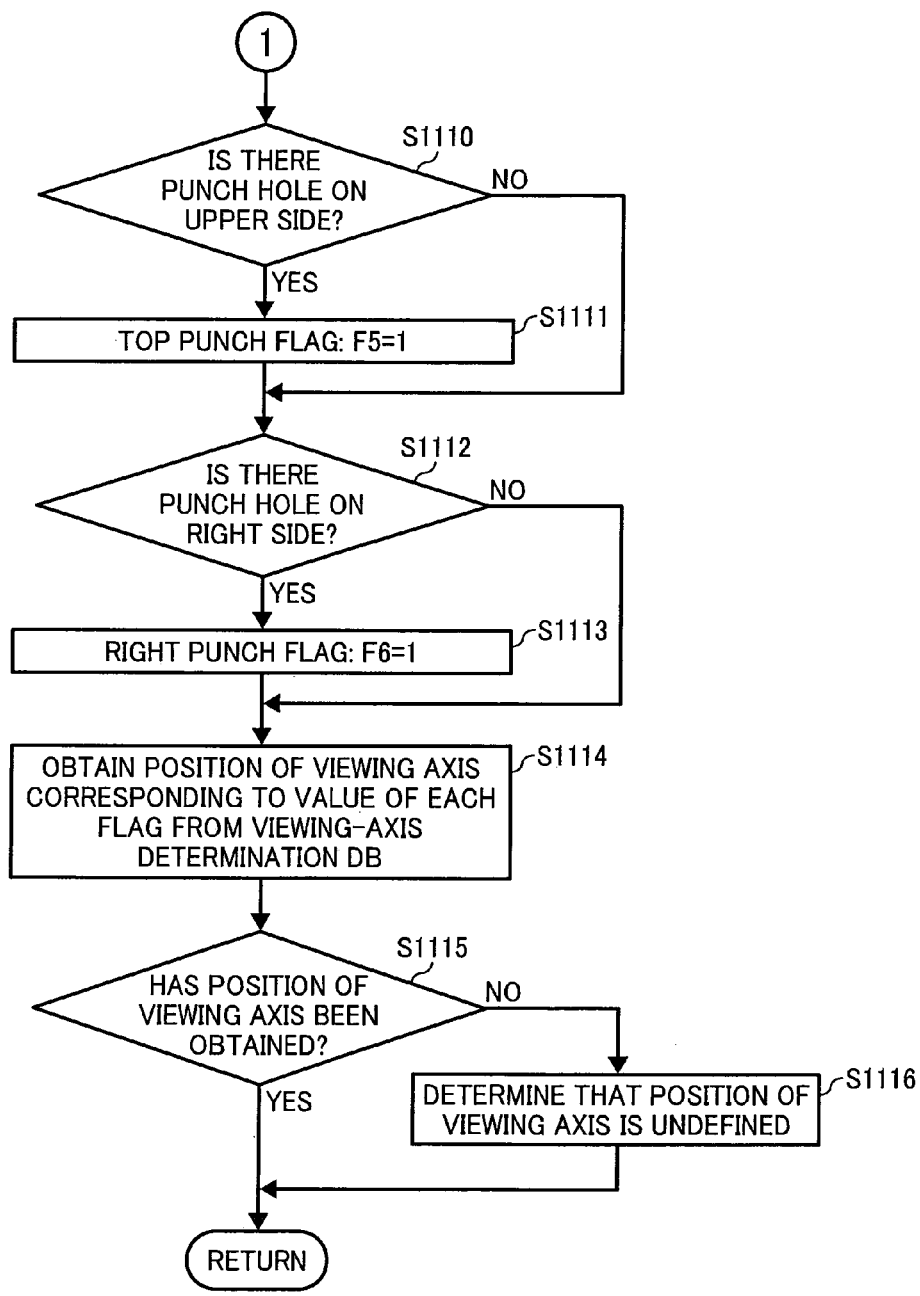

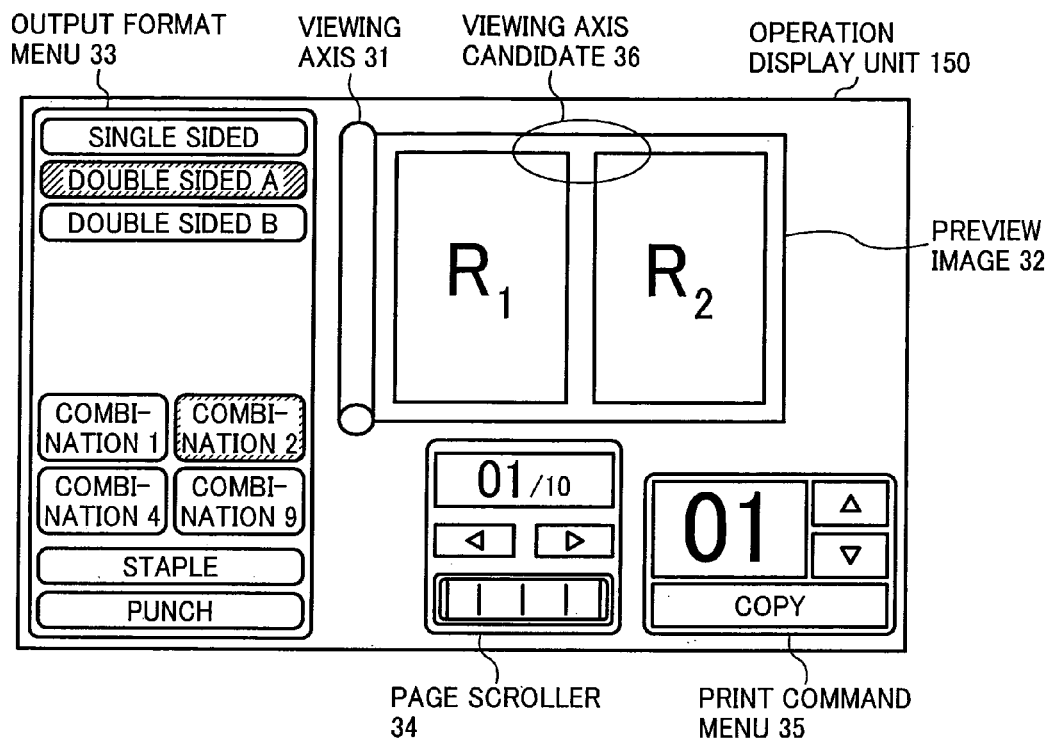
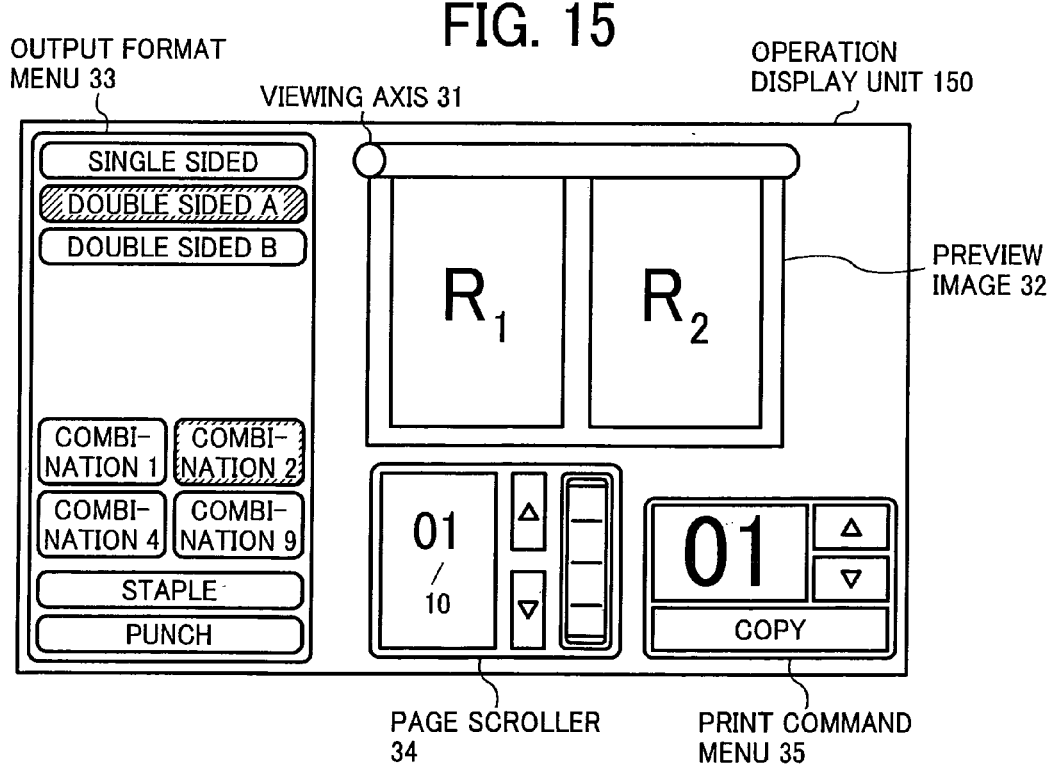

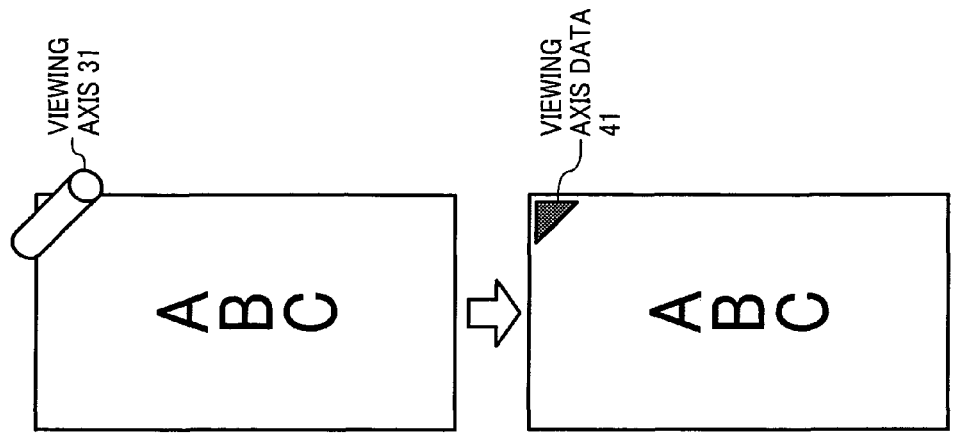
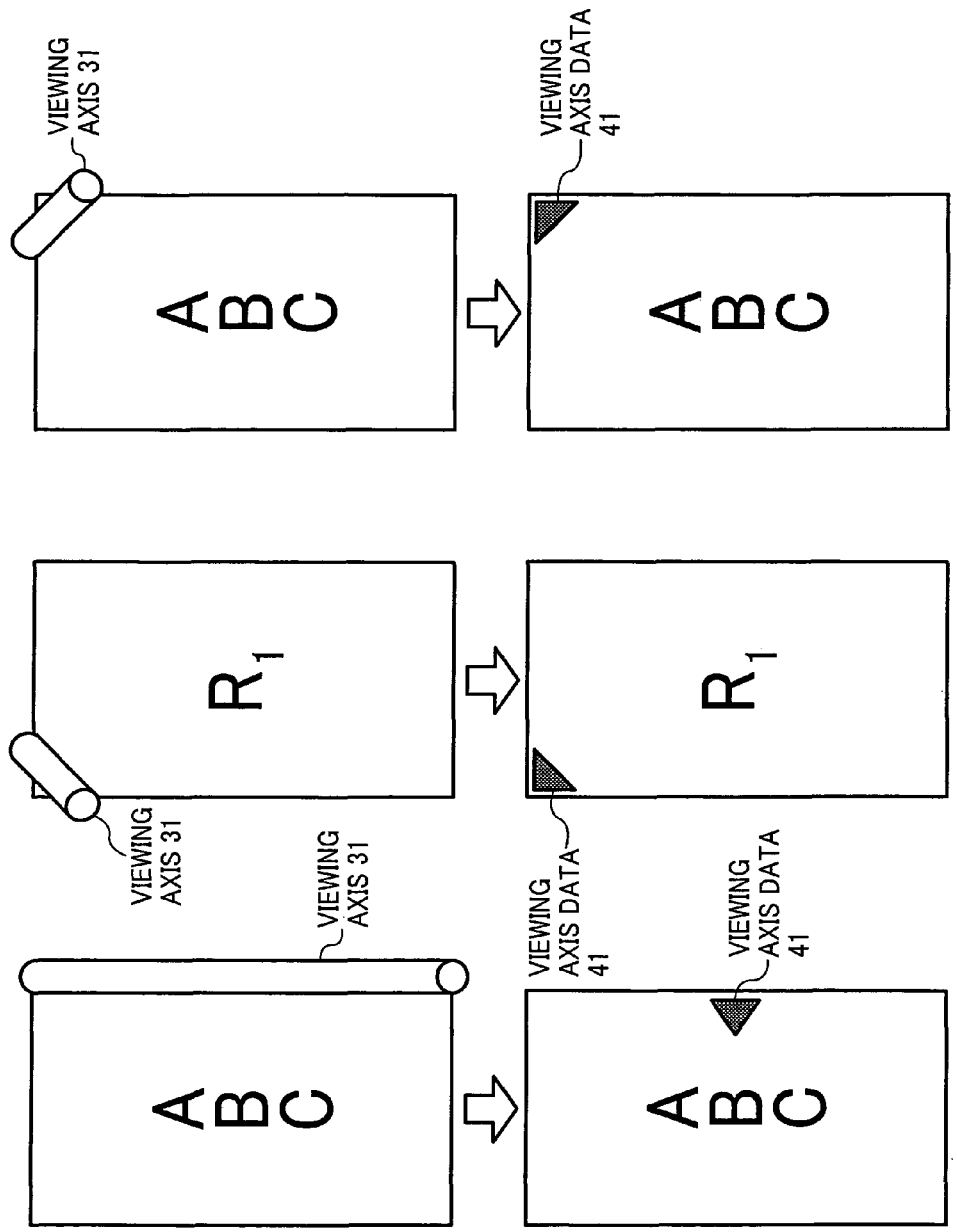
FIG. 21

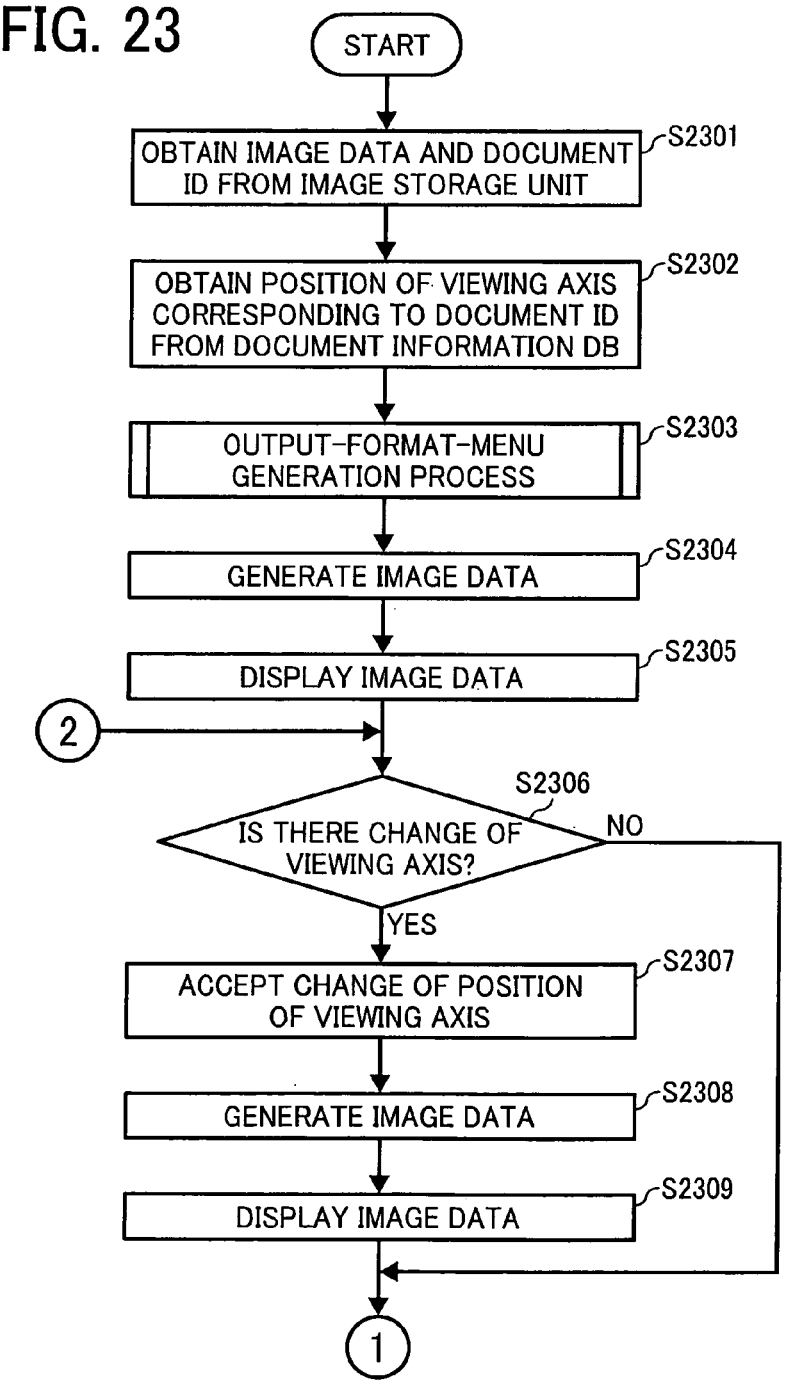

IMAGE PROCESSING APPARATUS, IMAGE FORMING APPARATUS, AND OUTPUT-FORMAT SETTING METHOD

CROSS-REFERENCE TO RELATED APPLICATIONS

The present application claims priority to and incorporates by reference the entire contents of Japanese priority document, 2007-157839 filed in Japan on Jun. 14, 2007.

BACKGROUND OF THE INVENTION

1. Field of the Invention

The present invention relates to an image processing apparatus, an image forming apparatus, and an output-format setting method.

2. Description of the Related Art

Conventionally, scanners, copying machines, facsimile machines, multi function peripherals (MFPs) and the like are generally known as apparatuses that process image information. While these apparatuses include various functions, because a function to be set needs to be selected from a large number of menu items for setting these functions, there is a problem that operations become complicated.

For solving such a problem, an image forming apparatus that narrows down and displays menu items that can be selected based on characteristics of an original document has been disclosed (see Japanese Patent Application Laid-open No. 2006-3568). This image forming apparatus reads the original document by the scanner or the like and determines the characteristics of the read image information. Further, by narrowing down the items to be displayed based on the determined characteristics, only the selectable items are displayed with respect to the read image information. Accordingly, a user can select the items more easily, as compared with a case of displaying all items.

However, in the technique described in Japanese Patent Application Laid-open No. 2006-3568, although an item desired to be set can be easily selected as compared with a case of displaying all items, the all items that can be selected from the read image information are displayed. Therefore, there are still too many choices for the user, and a processing condition with respect to image data cannot be set easily.

SUMMARY OF THE INVENTION

It is an object of the present invention to at least partially solve the problems in the conventional technology.

According to an aspect of the present invention, there is provided an image processing apparatus including an image-information obtaining unit that obtains image information; a form determining unit that determines form information indicating a characteristic of limiting a position of a viewing axis that is an axis for turning over a page a print on which the image information is printed, based on the image information obtained by the image-information obtaining unit; a viewing-axis determining unit that determines the position of the viewing axis based on the form information determined by the form determining unit; a format limiting unit that limits format information that can be set according to the position of the viewing axis determined by the viewing-axis determining unit; and a format receiving unit that receives an input of the format information limited by the format limiting unit.

Furthermore, according to another aspect of the present invention, there is provided an image processing apparatus including an image-information obtaining unit that obtains image information; an image display unit that displays the image information obtained by the image-information obtaining unit; a viewing-axis receiving unit that receives an input of a position of a viewing axis that is an axis for turning over a page of a print on which the image data is printed with respect to the image information displayed by the image display unit; a format limiting unit that limits format information that can be set according to the position of the viewing axis received by the viewing-axis receiving unit; and a format receiving unit that receives an input of the format information limited by the format limiting unit.

Moreover, according to still another aspect of the present invention, there is provided an output-format setting method including obtaining image information; form determining including determining form information indicating a characteristic of limiting a position of a viewing axis that is an axis for turning over a page a print on which the image information is printed, based on the image information obtained at the obtaining; viewing-axis determining including determining the position of the viewing axis based on the form information determined at the form determining; format limiting including obtaining the format information associated with the position of the viewing axis determined at the viewing-axis determining from a format storage unit that stores therein the format information in association with the position of the viewing axis and limiting the format information to obtained format information; and receiving an input of the format information limited at the limiting.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a schematic diagram for explaining one example of a data configuration of a viewing-axis determination database;

FIG. 9 is a schematic diagram for explaining one example of a data configuration of an output format database;

FIGS. 11A and 11B are flowcharts of a viewing-axis determination process procedure performed by the viewing-axis determining unit;

FIG. 14 is a schematic diagram for explaining another example of the display screen displayed on the operation display unit;

FIG. 15 is a schematic diagram for explaining one example of the display screen when a position of the viewing axis is changed;

FIG. 21 is a schematic diagram for explaining an example in which the preview image displayed on the operation display unit and the viewing axis are embedded in image data;

FIG. 22 is a schematic diagram for explaining one example of a data configuration of a document information database according to a fourth embodiment of the present invention;

FIG. 23 is a flowchart of an output-format setting/output process procedure performed by a scanner, a form determining unit, the viewing-axis determining unit, an output-format menu generator, an operation display controller, a printer controller, and a finishing processor;

BRIEF DESCRIPTION OF THE DRAWINGS

Exemplary embodiments of the present invention will be explained below in detail with reference to the accompanying drawings. Note that the present invention is not limited to the embodiments.

A first embodiment of the present invention is explained with reference to accompanying drawings. The first embodiment is an example in which a so-called multi function peripheral (MFP) is applied as an image processing apparatus, in which a copy function, a facsimile (FAX) function, a printing function, a scanner function, and a function for distributing an input image (an original document image read by the scanner function or an image input by the printer or FAX function) are combined.

Figure 1:
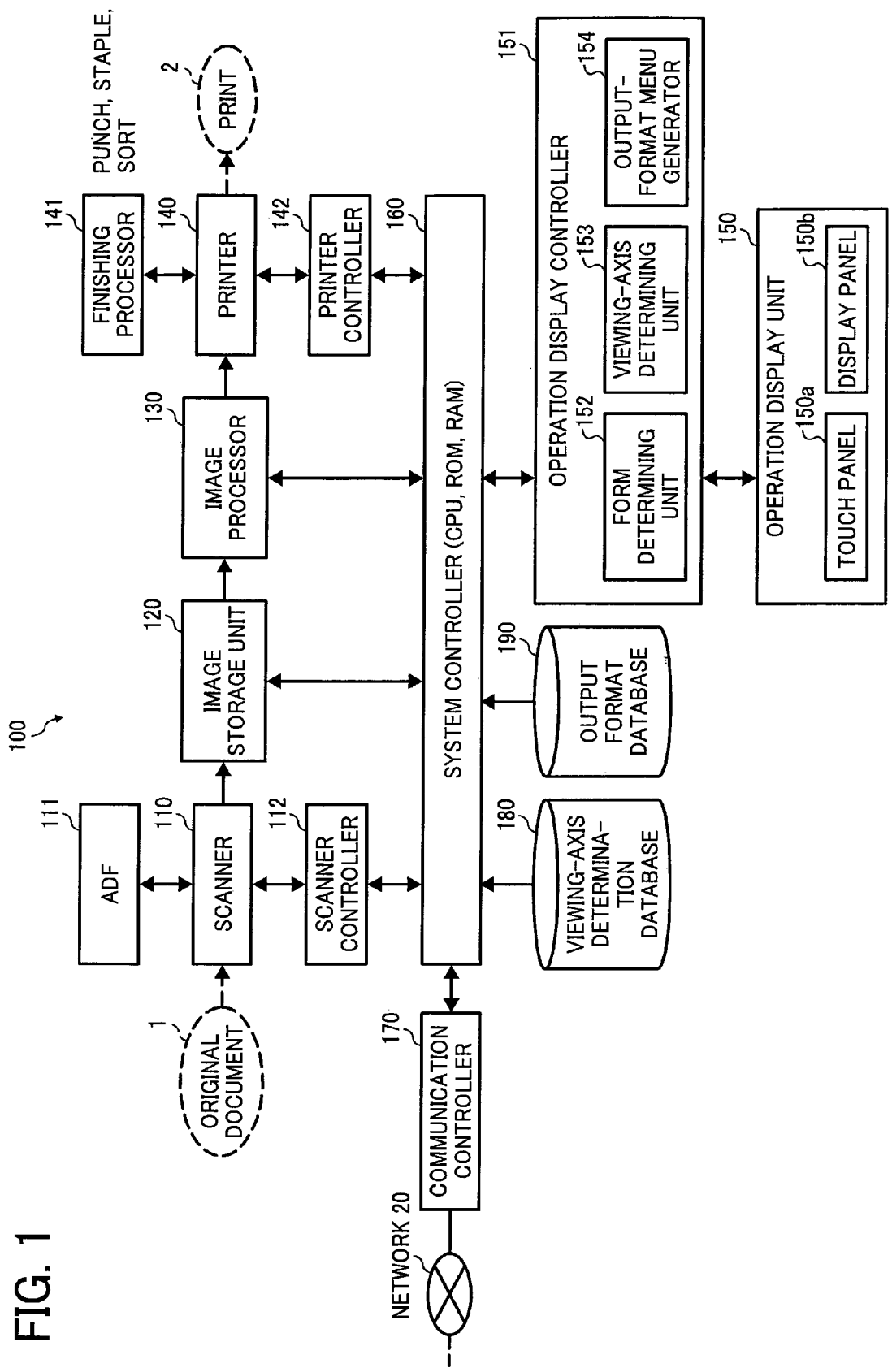
FIG. 1 is a block diagram of a configuration of an MFP according to a first embodiment of the present invention.

FIG. 1 is a block diagram of a configuration of an MFP 100 according to the first embodiment. The MFP 100 according to the first embodiment includes a scanner 110, an automatic document feeder (ADF) 111, a scanner controller 112, an image storage unit 120, an image processor 130, a printer 140, a printer controller 142, a finishing processor 141, an operation display unit 150, an operation display controller 151, a system controller 160, a communication controller 170, a viewing-axis determination database 180, and an output format database 190. The MFP 100 is connected to a network 20 via the communication controller 170. The MFP 100 reads an image on an original document 1 to perform image processing, and outputs the image as a print 2.

The system controller 160 is connected to respective constituent units, and executes control of the MFP 100. For example, the system controller 160 performs control such as providing scanning area information appropriate for the selected paper size to the scanner 110. The system controller 160 includes a central processing unit (CPU) (not shown), a read only memory (ROM), and a random access memory (RAM). Various processing is executed by operation of the CPU using a work area of the RAM based on a computer program stored in the ROM.

The program executed by the MFP 100 can be provided in an installable or executable format file, and recorded on a computer readable recording medium such as a CD-ROM, a flexible disk (FD), or a digital versatile disk (DVD) and distributed. In this case, the CPU in the system controller 160 reads the program from the recording medium to load the program onto a main memory (not shown), thereby realizing the various functions by the MFP 100. Alternatively, the program can be stored on a computer connected to the network 20 such as the Internet and provided by downloading the program via the network. Further, the program can be provided or distributed via the network such as the Internet.

The communication controller 170 is connected to the network 20 such as a local area network (LAN) or the Internet, and transfers the image data, control data, and the like between the communication controller 170 and other equipment connected to the network according to a communication protocol.

The scanner 110 is controlled by the scanner controller 112, and converts the image of the original document 1 to digital image data. The ADF 111 can feed a plurality of pages of the set original documents one by one sequentially to a read position of the scanner 110. The scanner 110 can continuously and automatically read the original documents by using the ADF 111. The ADF 111 can feed not only a single-sided original document printed on one side of the sheet but also a double-sided original document printed on both sides by reversing the double-sided original document to the scanner 110. Therefore, the double-sided original document can be read by the scanner 110. Upon reception of a command of the system controller 160, the scanner controller 112 controls the scanner 110.

The image storage unit 120 is a buffer memory that temporarily stores the image data read by the scanner 110 and the image data input from outside through the network, upon reception of a command of the system controller 160. The MFP 100 according to the first embodiment can form an image by processing both the image data read from the scanner 110 provided therein and the image data input from outside through the network 20 or the like.

Upon reception of a command of the system controller 160, the image processor 130 performs γ-correction, MTF correction, or the like with respect to multilevel data transmitted from the scanner 110 and temporarily stored in the image storage unit 120, and then performs binarization (or multilevel) processing by performing tone processing such as slice processing or dither processing on the data. The image processor 130 performs various types of image processing (enlarge/reduce, adjustment of density/color, and the like) corresponding to the function set by the user, image-area editing processing (area deletion, area shift, area inversion, and the like), layout processing (double-sided/single-sided printing, intensive printing, margin size adjustment, and the like), and generation processing of the preview image of the finished state.

The printer 140 is controlled by the printer controller 142. The printer 140 is an electrophotographic printer, which deflects to scan optical beams based on the image data processed by the image processor 130, develops an electrostatic latent image formed on a photoconductor by using a toner, transfers the generated toner image onto a transfer sheet, and performs a fixing process. As a printing method of the printer 140, various methods can be used such as an inkjet method, a sublimation dye transfer printing method, a silver salt photographic method, a direct thermal recording method, and a thermofusible transfer method, other than the electrophotographic method. Upon reception of a command of the system controller 160, the printer controller 142 controls the printer 140.

The printer 140 includes the finishing processor 141. The finishing processor 141 receives automatic setting or setting by a user, and performs the finishing processing such as sorting for sorting the prints 2 having subjected to the printing processing by the unit of copies or pages, stamping for attaching a predetermined stamp onto a printing medium, stapling for aligning and binding a plurality of printing media by a staple, or punching for punching the printing media to be kept in binders or files.

Upon reception of a command of the system controller 160, the operation display controller 151 controls input and output of the operation display unit 150. For example, the operation display controller 151 controls output of the preview image processed by the image processor 130, the viewing axis on the preview image, and the output format menu limited by the position of the viewing axis to a touch panel 150a and a display panel 150b included in the operation display unit 150. The operation display controller 151 controls input of the touch panel 150a. The display panel 150b and the touch panel 150a are illustrated separately in the drawing; however, these are constructed integrally here.

The operation display controller 151 further includes a form determining unit 152, a viewing-axis determining unit 153, and an output-format menu generator 154. The form determining unit 152 obtains the image data stored in the image storage unit 120 and determines form information from the obtained image data. The form information indicates a characteristic for limiting the position of the viewing axis, which is an axis for turning over a page of the medium on which the image data is printed, and is used for determining the position of the viewing axis in the viewing-axis determining unit 153 described later. Specifically, the form information includes line information indicating whether characters included in the image data are written in vertical writing or horizontal writing, and top and bottom information indicating whether top and bottom are the same or reversed in an odd page and even page of the image data. In the first embodiment, the line information is a vertical writing flag (F3). When the character is written in the vertical writing, a value of the vertical writing flag is 1, and when the character is written in the horizontal writing, the value of the vertical writing flag is 0. In the first embodiment, the top and bottom information is a top and bottom flag (F2). When the top and bottom in the odd page and even page are reversed, a value of the top and bottom flag is 1, and when the top and bottom in the odd page and even page are the same, the value of the top and bottom flag is 0.

The viewing-axis determination database 180 stores a determination rule for determining the position of the viewing axis from the form information of the image data or the form information of the image data and the setting value with respect to the image data obtained by the operation display controller 151. FIG. 2 is a schematic diagram for explaining one example of a data configuration of the viewing-axis determination database 180. As shown in FIG. 2, the viewing-axis determination database 180 stores the values of the respective flags in association with the position of the viewing axis determined by the value. The top and bottom flag and the vertical writing flag are determined based on the image data by the form determining unit 152. A double-sided flag, a left punch flag, an upper punch flag, and a right punch flag are determined based on the setting value obtained by the operation display controller 151.

The double-sided flag indicates whether the image data is to be printed on double sides or a single side when the image data is output to the medium. When the image data is printed on double sides, the value of the double-sided flag is 1, and when the image data is printed on the single side, the value of the double-sided flag is 0. The left punch flag, the upper punch flag, and the right punch flag indicate the position where the punching is performed with respect to the output medium, and three flags do not take 1 simultaneously. The value of the top and bottom flag can take 1 only when the double-sided flag is 1. That is, when the original document is a single-side original document and the double-sided printing is set, the value of the top and bottom flag is set to 0. It is determined that the position of the viewing axis is left oblique or right oblique only when the double-sided flag is 0, that is, only when the single-sided printing is to be performed, and an oblique viewing axis precedes other viewing axes. When the viewing axis cannot be determined in FIG. 2, it is determined that the viewing axis is undefined (error). The double-sided flag is the print information according to the present invention, and the left punch flag, the upper punch flag, and the right punch flag are binding direction information according to the present invention. The binding direction information indicates a direction for binding the output media.

The viewing-axis determining unit 153 determines the position of the viewing axis of the image data according to the determination rule corresponding to the form information stored in the viewing-axis determination database 180 and determined by the form determining unit 152. The viewing-axis determining unit 153 determines the position of the viewing axis of the image data according to the determination rule corresponding to the form information determined by the form determining unit 152 and the format information obtained by the operation display controller 151. The viewing axis is an axis at the time of turning over the page of the media on which the image data is printed, and the position of the viewing axis is any one of upper left, upper right, left end, right end, and top end of the media on which the image data is printed so that the image data is erect. "The image is erect" means that the inclination of the characters included in the image data is not transverse or opposite direction, and approximately 0 degree. In the first embodiment, the position of the viewing axis is described such that upper left is left oblique, upper right is right oblique, the left end is left, the right end is right, and the top end is top. The format information is the output format set for the image data, that is, a processing content performed with respect to the image data or the print.

Figure 3:
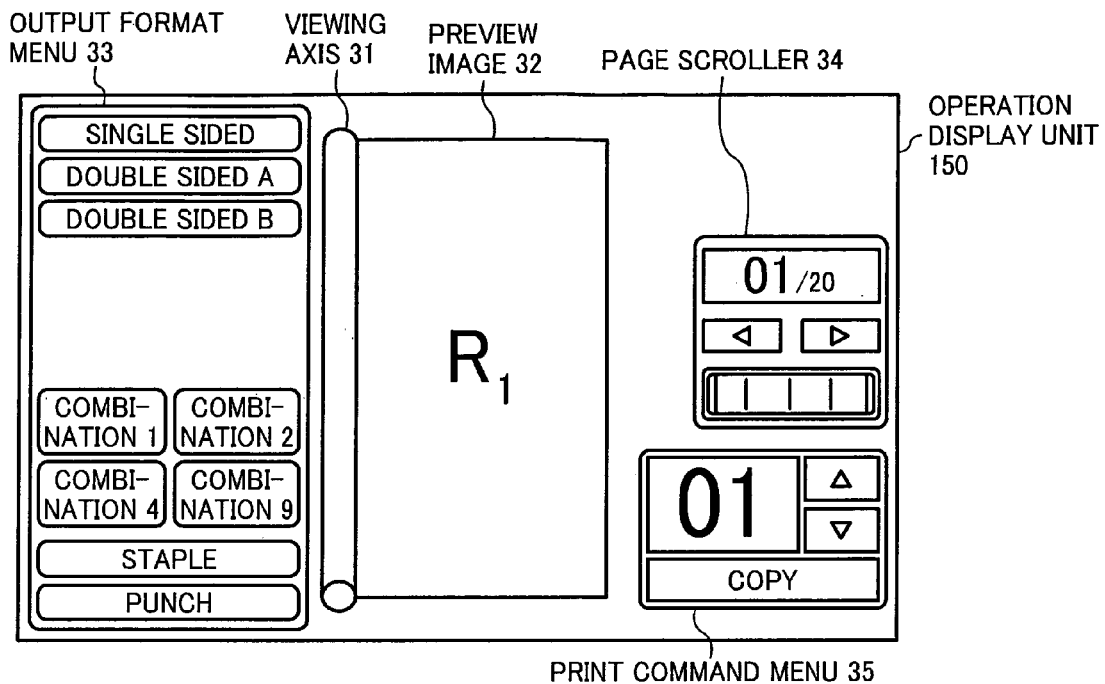
FIG. 3 is a schematic diagram of an example of a preview image displayed on an operation display unit and a viewing axis where the viewing axis is set on the left with respect to the preview image of a horizontally written image data.

FIGS. 3 to 8 are schematic diagrams for explaining one example of the preview image displayed on the operation display unit 150 and the viewing axis. FIG. 3 depicts a case that the viewing axis 31 is set on the left with respect to a preview image 32 of a horizontally written image data. An output format menu 33 displays processing items settable to the image data. A page scroller 34 specifies a page of the preview image to be displayed on the operation display unit. A Print command menu 35 specifies the number of prints and start of printing.

Figure 4:
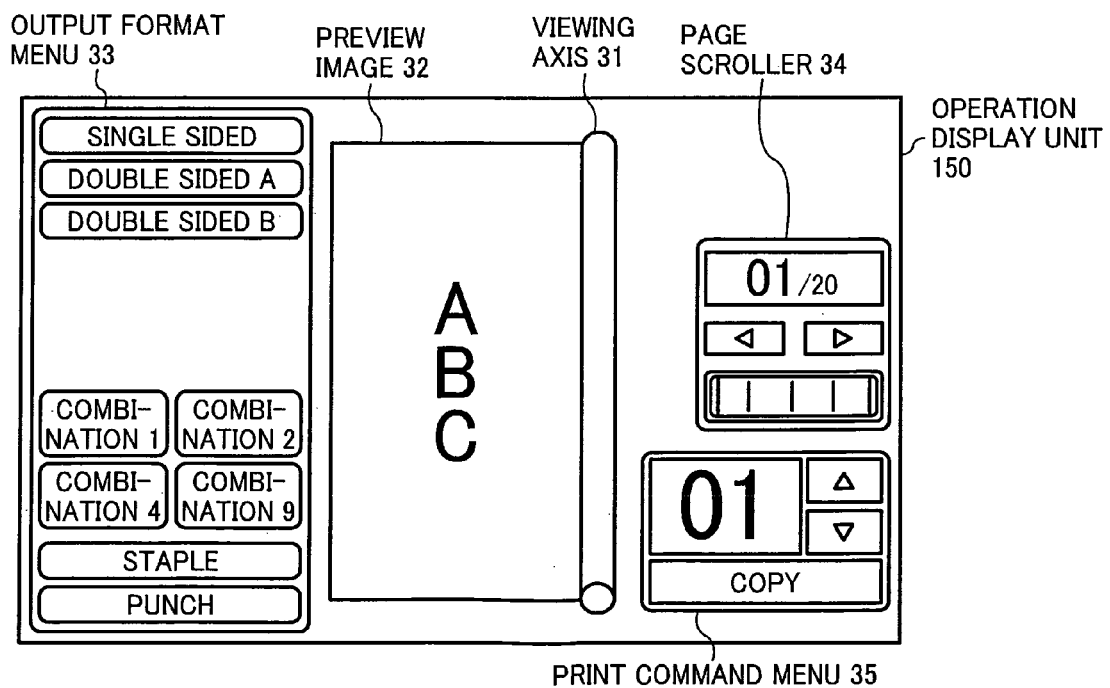
FIG. 4 is a schematic diagram of an example of the preview image displayed on the operation display unit and the viewing axis where the viewing axis is set on the right with respect to the preview image of a vertically written image data.
Figure 5:
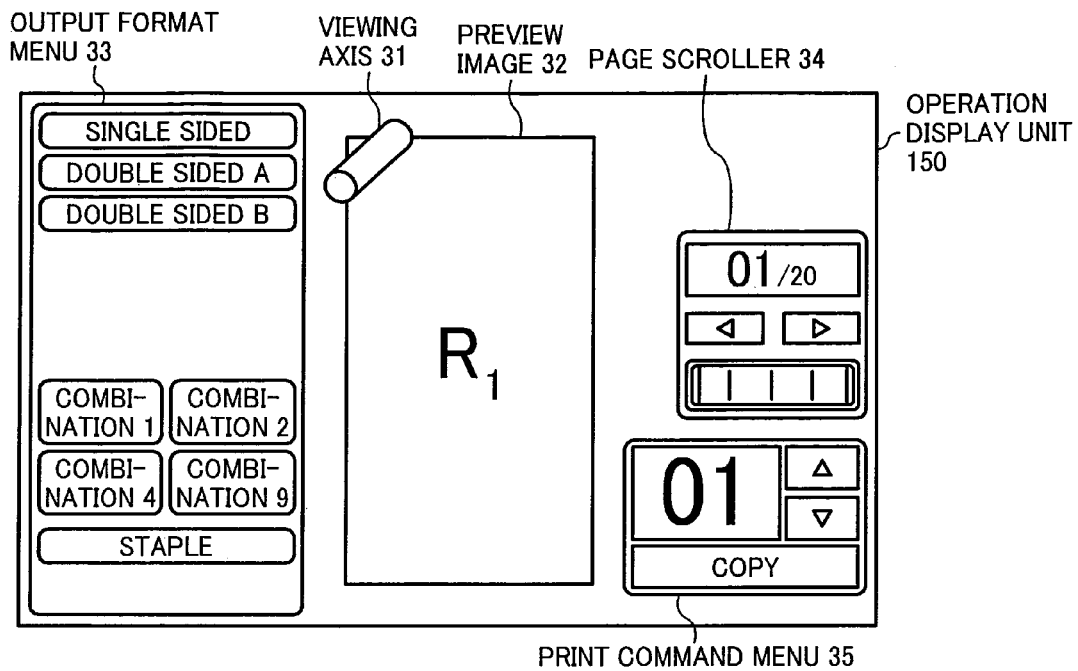
FIG. 5 is a schematic diagram of an example of the preview image displayed on the operation display unit and the viewing axis where the viewing axis is set on left oblique with respect to the preview image of a horizontally written image data.
Figure 6:
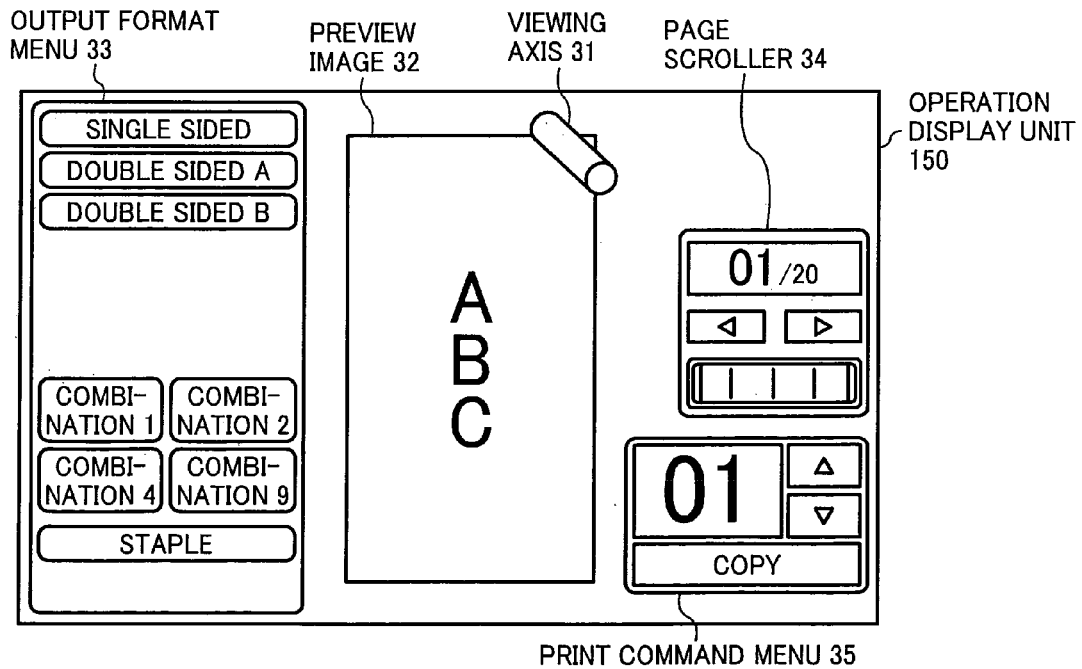
FIG. 6 is a schematic diagram of an example of the preview image displayed on the operation display unit and the viewing axis where the viewing axis is set on right oblique with respect to the preview image of a vertically written image data.
Figure 7:
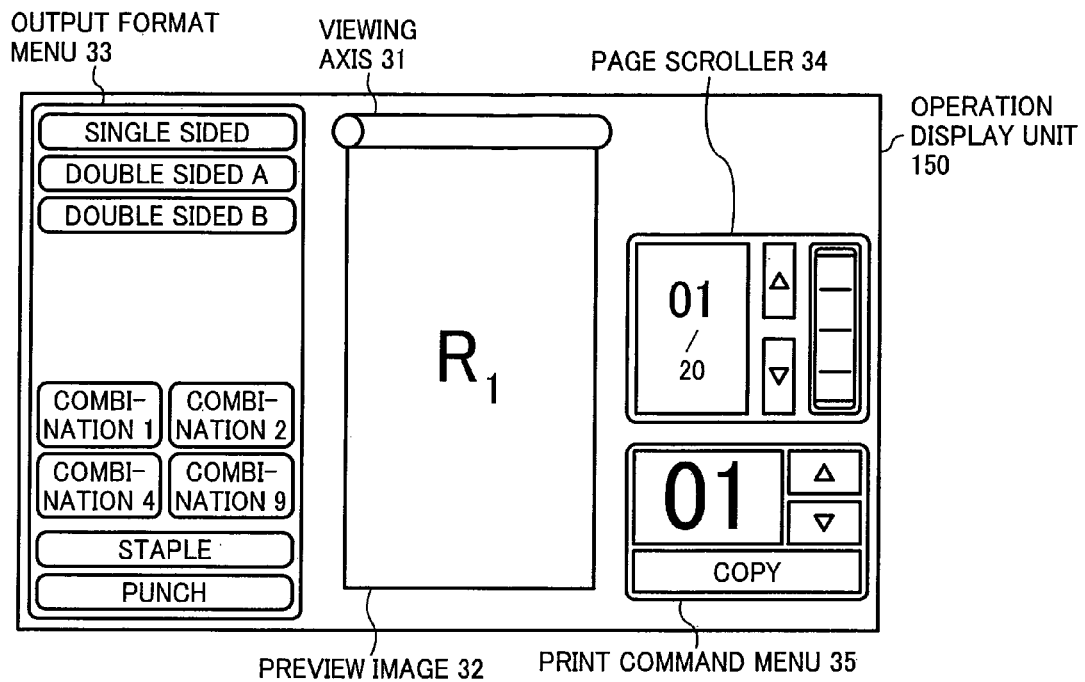
FIG. 7 is a schematic diagram of an example of the preview image displayed on the operation display unit and the viewing axis where the viewing axis is set at the top of the preview image of a horizontally written image data.
Figure 8:
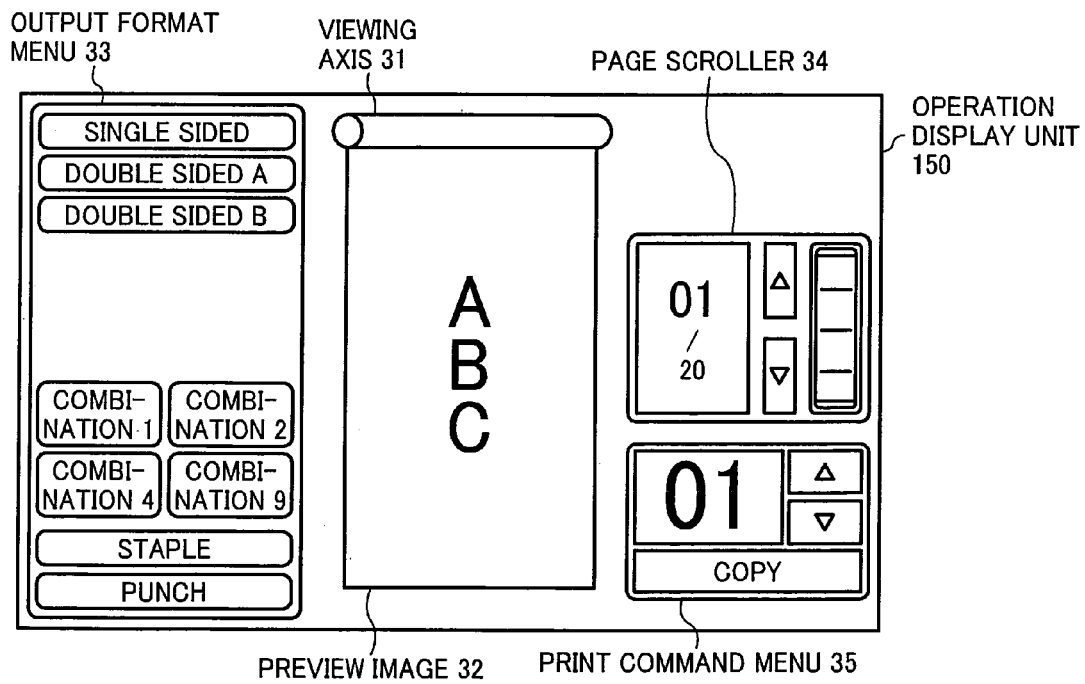
FIG. 8 is a schematic diagram of an example of the preview image displayed on the operation display unit and the viewing axis where the viewing axis is set at the top of the preview image of a vertically written image data.

FIG. 4 depicts a case that the viewing axis 31 is set on the right with respect to the preview image 32 of a vertically written image data. FIG. 5 depicts a case that the viewing axis 31 is set on left oblique with respect to the preview image 32 of a horizontally written image data. FIG. 6 depicts a case that the viewing axis 31 is set on right oblique with respect to the preview image 32 of a vertically written image data. FIG. 7 depicts a case that the viewing axis 31 is set at the top of the preview image 32 of a horizontally written image data. FIG. 8 depicts a case that the viewing axis 31 is set at the top of the preview image 32 of a vertically written image data.

The output format database 190 stores the setting items settable corresponding to the position of the viewing axis and the setting values. FIG. 9 is a schematic diagram for explaining one example of a data configuration of the output format database 190. The output format database 190 stores the position of the viewing axis in association with the settable setting items and the setting values. As shown in FIG. 9, when the position of the viewing axis is "upper left", the stapler is set to "left oblique" and "none" is set for punch.

The output-format menu generator 154 obtains the setting item and the setting value corresponding to the position of the viewing axis determined by the viewing-axis determining unit 153 to generate the output format menu. For example, when the position of the viewing axis is "upper left", "left oblique" for the stapler and "none" for the punch are obtained from the output format database 190. In this case, a screen as shown in FIG. 5 is displayed by the operation display controller 151. When staple is instructed on the screen, the "left oblique" staple, which is the setting value for the staple stored in the output format database 190, is selected without instructing the position of the staple on the screen, and the staple is displayed at the left oblique position in the preview image on the screen. Because the punching cannot be selected, it is not displayed on the menu. In this manner, because the setting item and the setting value selectable by the user are limited and displayed by setting the position of the viewing axis, huge menu items are not displayed. Accordingly, the user can easily set the intended setting item and setting value without performing the complicated operation. The output-format menu generator 154 forms a format limiting unit according to the present invention.

The touch panel 150a electrically and magnetically detects a position on the panel where a pointer touches. As a specifying unit (not shown) for the touch panel 150a, a fingertip of a human, a stylus pen, and other contact tools (hereinafter, pointer) can be applied. That is, the user input the various items including the printing condition by touching the touch panel 150a with the pointer.

In the first embodiment, while touch input to the touch panel has been explained as an example, it is not necessarily the only embodiment of the present invention. For example, the operation display unit 150 can include a hardware key to receive physical pressing of the key by the user for input other than the touch panel 150a so that a command such as printing can be made. The display panel 150b can use an exclusive display apparatus provided in the MFP 100.

The operation display unit 150, controlled by the operation display controller 151, receives input of setting contents via the touch panel 150a, and displays the preview image and menu items for setting a processing condition of the image data on the display panel 150b, which is a display unit.

The operation display unit 150 displays functions to be executed by the MFP 100 as the menu items of a setting screen, and the operation display unit 150 receives setting inputs by the user from the displayed menu items, to obtain item values. That is, when the pointer touches the touch panel 150a, the operation display unit 150 detects a coordinate of a pressed part. When the touch on the selectable area is detected, the setting item value is received, assuming that the applicable item is received as selection.

Figure 10A:
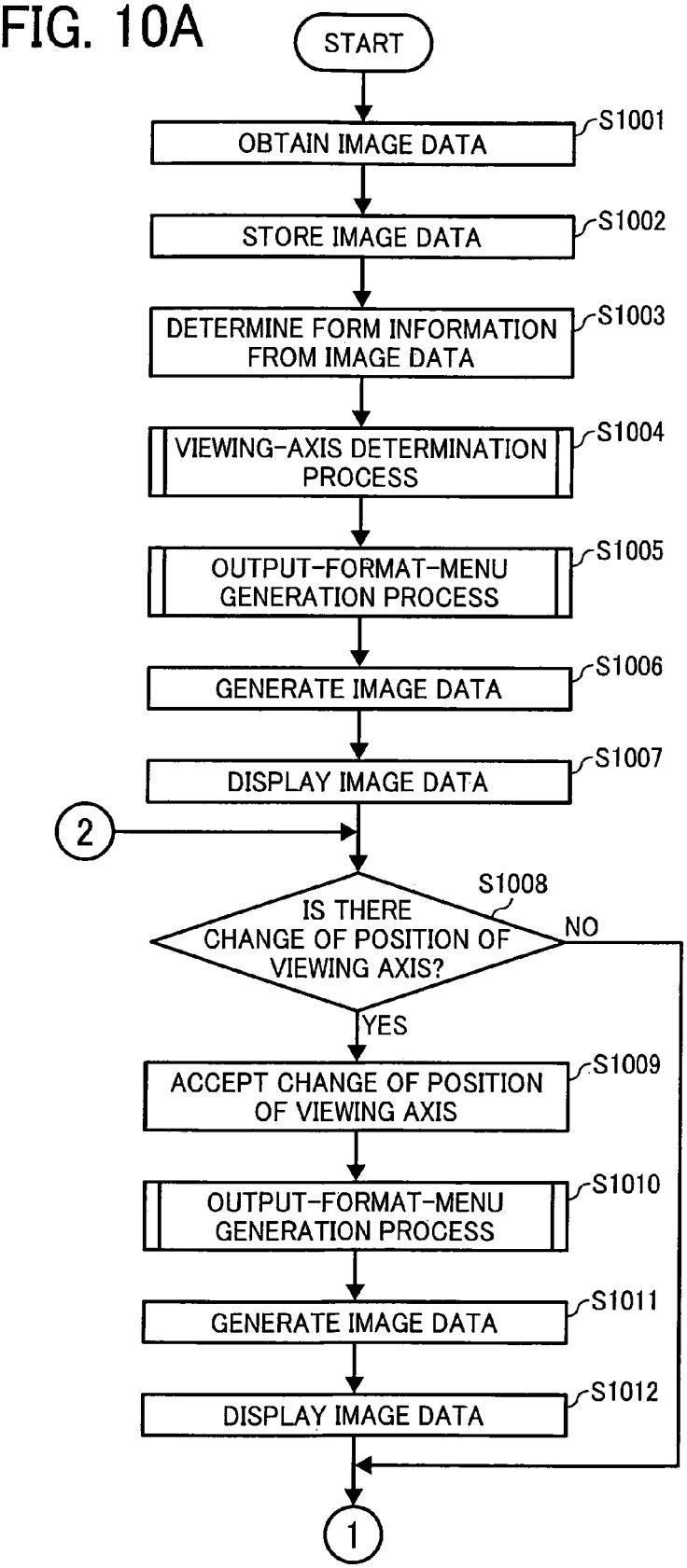
FIGS. 10A and 10B are flowcharts of an output-format setting/output process procedure performed by a scanner, a form determining unit, the viewing-axis determining unit, an output-format menu generator, an operation display controller, a printer controller, and a finishing processor.
Figure 10B:
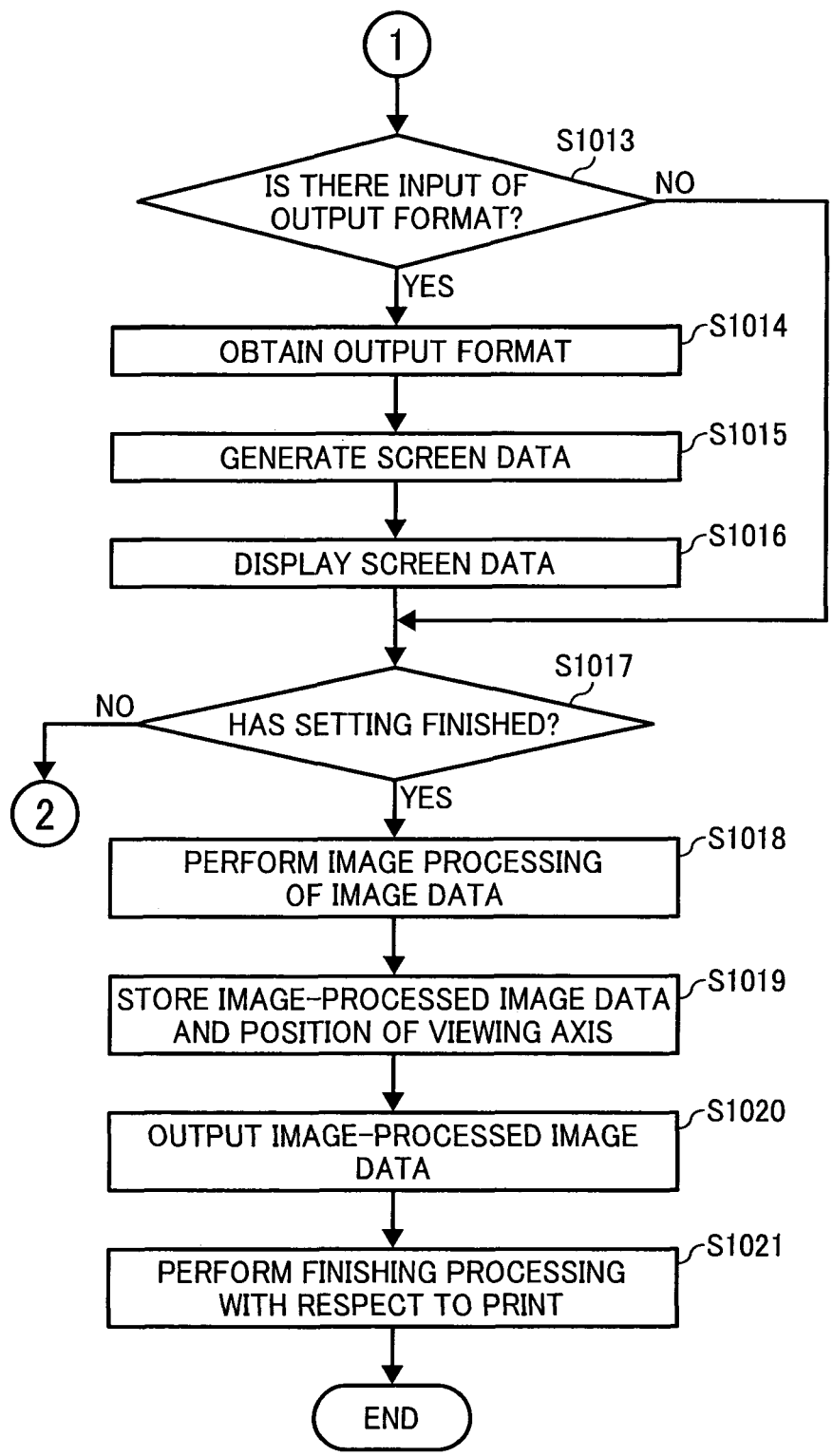

An output-format setting/output process by the MFP 100 having such a configuration is explained next. FIGS. 10A and 10B are flowcharts of the output-format setting/output process procedure performed by the scanner, the form determining unit, the viewing-axis determining unit, the output-format menu generator, the operation display controller, the printer controller, and the finishing processor.

The scanner 110 reads the original document 1 to obtain the image data (Step S1001). The scanner 110 stores the obtained image data in the image storage unit 120 (Step S1002). The form determining unit 152 obtains the image data from the image storage unit 120 to determine the form information based on the obtained image data (Step S1003). The viewing-axis determining unit 153 determines the position of the viewing axis based on the determined form information (Step S1004). Details of a viewing-axis determination process are given later. The output-format menu generator 154 executes an output-format-menu generation process (Step S1005). Details of the output-format-menu generation process are given later.

The operation display controller 151 generates screen data (Step S1006). Specifically, the operation display controller 151 generates the screen data including the preview image, the viewing axis, and the output format menu generated based on the image data as shown in FIG. 3. The operation display controller 151 displays the generated screen data on the operation display unit 150 (Step S1007). The operation display controller 151 determines whether to change the position of the viewing axis (Step S1008). When the operation display controller 151 determines not to change the position of the viewing axis (NO at Step S1008), control proceeds to Step S1013. When it is determined to change the position of the viewing axis (YES at Step S1008), the operation display controller 151 receives a change of the position of the viewing axis according to the instruction on the preview image (Step S1009). The output-format menu generator 154 executes the output-format-menu generation process corresponding to the changed position of the viewing axis (Step S1010). The operation display controller 151 generates the screen data (Step S1011), and displays the generated screen data on the operation display unit 150 (Step S1012).

The operation display controller 151 determines whether there is an input of the output format (Step S1013). When determining that there is no input of the output format (NO at Step S1013), the operation display controller 151 proceeds to Step S1017. When determining that there is an input of the output format (YES at Step S1013), the operation display controller 151 obtains the output format (Step S1014). Specifically, the operation display controller 151 specifies the setting item from the output format menu displayed on the operation display unit 150 and specifies the setting value corresponding to the setting item, thereby obtaining the output format (format information). The operation display controller 151 generates the screen data corresponding to the obtained output format (Step S1015). The operation display controller 151 displays the generated screen data on the operation display unit 150 (Step S1016).

The operation display controller 151 determines whether the setting with respect to the image data has finished (Step S1017). Specifically, the determination is made based on whether the Print command menu is instructed. When determining that the setting with respect to the image data has not finished yet (NO at Step S1017), the operation display controller 151 returns to Step S1008. When the operation display controller 151 has determined that the setting with respect to the image data has finished (YES at Step S1017), the image processor 130 processes the image data according to the set output format (Step S1018). The image processor 130 stores the image-processed image data and the position of the viewing axis in the image storage unit 120 (Step S1019). The printer controller 142 outputs the image-processed image data from the printer 140 (Step S1020). The finishing processor 141 performs the finishing processing with respect to the output print 2 (Step S1021).

Figure 11A:
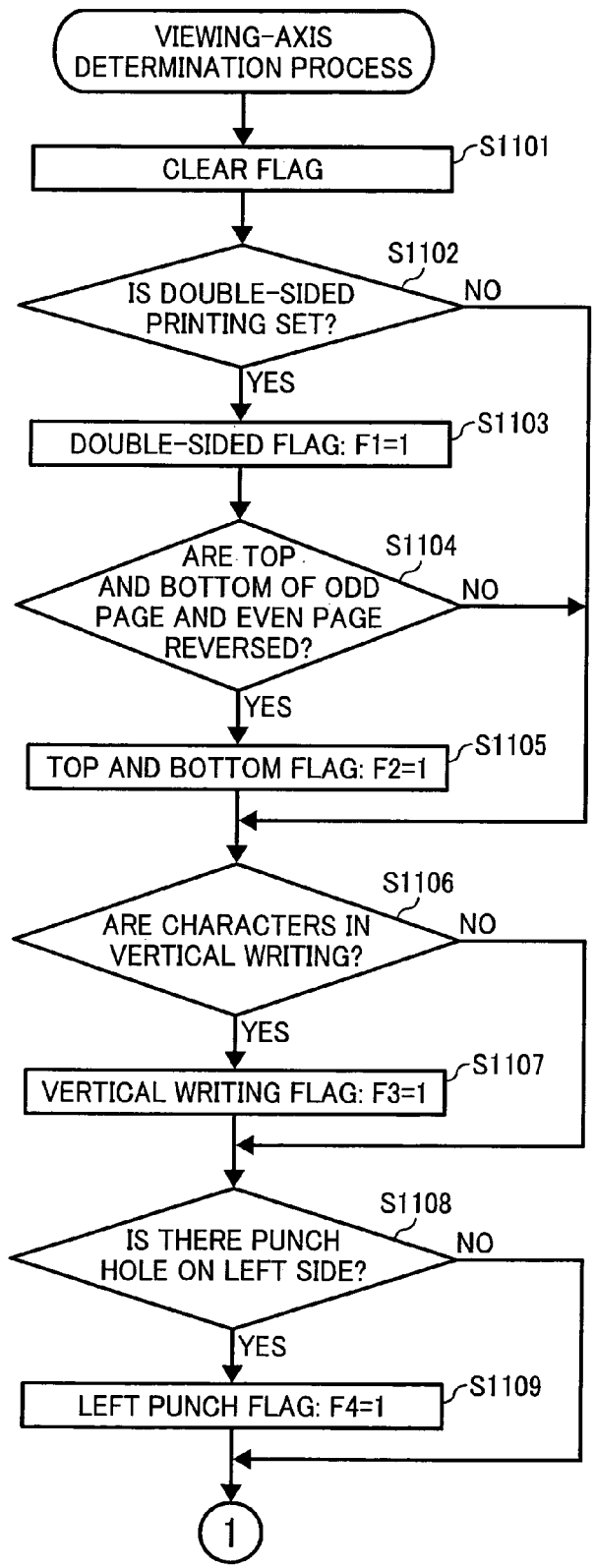

The viewing-axis determination process performed by the viewing-axis determining unit 153 is explained next. FIGS. 11A and 11B are flowcharts of a viewing-axis-determination process procedure performed by the viewing-axis determining unit.

The viewing-axis determining unit 153 sets the flag used for viewing axis determination to 0 (Step S1101). The viewing-axis determining unit 153 determines whether the double-sided printing has been set (Step S1102). When determining that the double-sided printing has been set (YES at Step S1102), the viewing-axis determining unit 153 sets 1 to the double-sided flag (F1) (Step S1103). When determining that the double-sided printing has not been set (NO at Step S1102), the viewing-axis determining unit 153 proceeds to Step S1106.

The viewing-axis determining unit 153 determines whether the top and bottom of the odd page and the even page of the read image data are reversed (Step S1104). When determining that the top and bottom of the odd page and the even page of the image data are not reversed (NO at Step S1104), the viewing-axis determining unit 153 proceeds to Step S1106. When determining that the top and bottom of the odd page and the even page of the image data are reversed (YES at Step S1104), the viewing-axis determining unit 153 sets 1 to the top and bottom flag (F2) (Step S1105).

The viewing-axis determining unit 153 determines whether the characters in the read image data are in vertical writing (Step S1106). When determining that the characters in the image data are not in vertical writing (NO at Step S1106), the viewing-axis determining unit 153 proceeds to Step S1108. When determining that the characters in the read image data are in vertical writing (YES at Step S1106), the viewing-axis determining unit 153 sets 1 to the vertical writing flag (F3). The viewing-axis determining unit 153 determines whether there is a punching command on the left side of the preview image (Step S1108). When determining that there is no punching command on the left side of the preview image (NO at Step S1108), the viewing-axis determining unit 153 proceeds to Step S1110. When determining that there is the punching command on the left side of the preview image (YES at Step S1108), the viewing-axis determining unit 153 sets 1 to the left punch flag (F4) (Step S1109).

The viewing-axis determining unit 153 determines whether there is a punching command on the upper side of the preview image (Step S1110). When determining that there is no punching command on the upper side of the preview image (NO at Step S1110), the viewing-axis determining unit 153 proceeds to Step S1112. When determining that there is the punching command on the upper side of the preview image (YES at Step S1110), the viewing-axis determining unit 153 sets 1 to the upper punch flag (F5) (Step S1111). The viewing-axis determining unit 153 determines whether there is a punching command on the right side of the preview image (Step S1112). When determining that there is no punching command on the right side of the preview image (NO at Step S1112), the viewing-axis determining unit 153 proceeds to Step S1114. When determining that there is the punching command on the right side of the preview image (YES at Step S1112), the viewing-axis determining unit 153 sets 1 to the right punch flag (F6) (Step S1113).

The viewing-axis determining unit 153 obtains the position of the viewing axis corresponding to the value of each flag from the viewing-axis determination database (Step S1114). The viewing-axis determining unit 153 determines whether the position of the viewing axis has been obtained (Step S1115). When determining that the position of the viewing axis has been obtained (YES at Step S1115), the viewing-axis determining unit 153 finishes the process. When determining that the position of the viewing axis has not been obtained (NO at Step S1115), the viewing-axis determining unit 153 determines that the position of the viewing axis is undefined (Step S1116), to finish the process.

Because the position of the viewing axis corresponding to the print to be output by the user can be determined by determining the position of the viewing axis according to the form information of the image data and the output format set by the user, the user need not instruct the position of the viewing axis again, and the user can receive a new concept of the viewing axis without having a sense of incompatibility.

Even when determination and setting are made with respect to only a part of the form information or the output format corresponding to the six flags (F1 to F6), because a default value (0) is set to each flag at Step S1101, the optimum position of the viewing axis can be determined for the determined or set form information or output format. Accordingly, even when only the form information is determined, or even when the form information and the output format are set, the position of the viewing axis can be determined according to the above process.

Figure 12:
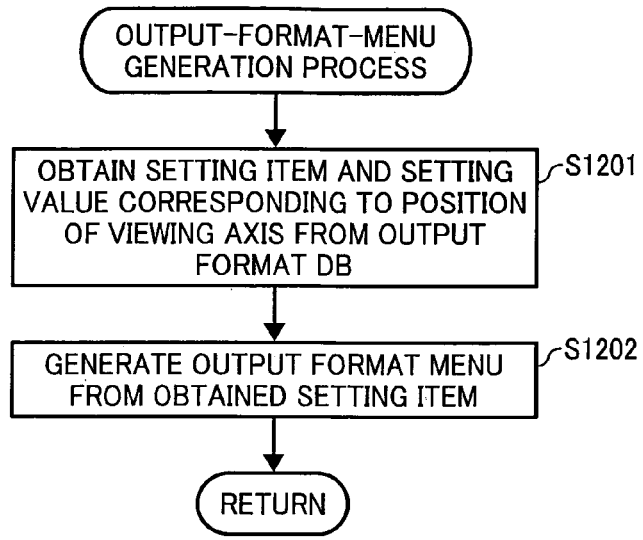
FIG. 12 is a flowchart of an output-format-menu generation process procedure performed by the output-format menu generator.

The output-format-menu generation process performed by the output-format menu generator 154 is explained next. FIG. 12 is a flowchart of the output-format-menu generation process procedure performed by the output-format menu generator.

The output-format menu generator 154 obtains the output format corresponding to the viewing axis, that is, the setting item and the setting value from the output format database 190 (Step S1201). When the position of the viewing axis is "left oblique", the setting value "left oblique" corresponding to the setting item "stapler", and the setting value "none" corresponding to the setting item "punch" are obtained. The output-format menu generator 154 generates the output format menu based on the obtained setting items (Step S1202). For example, when the position of the viewing axis is "left oblique", because there is an obtainable setting value in the setting item "stapler" but there is no obtainable setting value in the setting item "punch", as shown in FIG. 5, the output format menu is generated in which "stapler" is displayed and "punch" is not displayed.

In this manner, because the setting items of the output format menu are limited according to the position of the viewing axis, and the setting value selectable from the limited setting item is limited corresponding to the position of the viewing axis, the user can select the intended setting from the limited setting items and setting values, and an operation load on the user can be reduced.

The process is explained next in detail with reference to FIGS. 10 to 12. The scanner 110 reads the original document 1 to obtain the image data (Step S1001). It is assumed here that the original document 1 is horizontal writing. The scanner 110 stores the obtained image data in the image storage unit 120 (Step S1002). The form determining unit 152 obtains the image data from the image storage unit 120 to determine the form information based on the obtained image data (Step S1003). As the form information in the first embodiment, it is determined whether the line information is "horizontal writing". The viewing-axis determining unit 153 determines the position of the viewing axis based on the determined form information (Step S1004).

Specifically, the position of the viewing axis is determined in the process shown in FIGS. 11A and 11B. The viewing-axis determining unit 153 sets the flag used for the viewing axis determination to 0 (Step S1101). The viewing-axis determining unit 153 determines that the double-sided printing is not set (NO at Step S1102), and proceeds to Step S1106. The viewing-axis determining unit 153 then determines that the top and bottom of the odd page and the even page of the image data are not reversed (NO at Step S1104), and proceeds to Step S1106.

The viewing-axis determining unit 153 determines that the characters in the image data are not in vertical writing (NO at Step S1106) and proceeds to Step S1108. The viewing-axis determining unit 153 determines that there is no punching command on the left side of the preview image (NO at Step S1108) and proceeds to Step S1110. The viewing-axis determining unit 153 determines that there is no punching command on the upper side of the preview image (NO at Step S1110) and proceeds to Step S1112. The viewing-axis determining unit 153 determines that there is no punching command on the right side of the preview image (NO at Step S1112) and proceeds to Step S1114.

The viewing-axis determining unit 153 obtains the position of the viewing axis corresponding to the value of each flag from the viewing-axis determination database 180 (Step S1114). In this case, because all the values of F1 to F6 are 0, the position of the viewing axis is determined as "left oblique". The viewing-axis determining unit 153 determines that the position of the viewing axis has been obtained (YES at Step S1115) and finishes the process.

The output-format menu generator 154 executes the output-format-menu generation process (Step S1005). Specifically, the output-format menu generator 154 generates the output format menu in the process shown in FIG. 12. The output-format menu generator 154 obtains the setting item and the setting value corresponding to the position of the viewing axis from the output format database 190 (Step S1201). In this case, because the position of the viewing axis is "left oblique", the setting value "left oblique" corresponding to the setting item "stapler", and the setting value "none" corresponding to the setting item "punch" are obtained. The output-format menu generator 154 generates the output format menu based on the obtained setting items (Step S1202). For example, when the position of the viewing axis is "left oblique", because there is an obtainable setting value in the setting item "stapler" but there is no obtainable setting value in the setting item "punch", the output format menu is generated in which "stapler" is displayed and "punch" is not displayed.

Returning to the process in FIG. 10A, the operation display controller 151 generates the screen data (Step S1006). Specifically, the operation display controller 151 generates the screen data including the preview image, the viewing axis, and the output format menu generated based on the image data. For example, the operation display controller 151 generates the screen data as shown in FIG. 5. The operation display controller 151 displays the generated screen data on the operation display unit 150 (Step S1007). The operation display controller 151 determines whether to change the position of the viewing axis (Step S1008). When the change of the position of the viewing axis is to be received, the position of the viewing axis as a candidate can be blinked based on the form information and the output format. The operation display controller 151 determines not to change the position of the viewing axis (NO at Step S1008), and proceeds to Step S1013.

Figure 13:
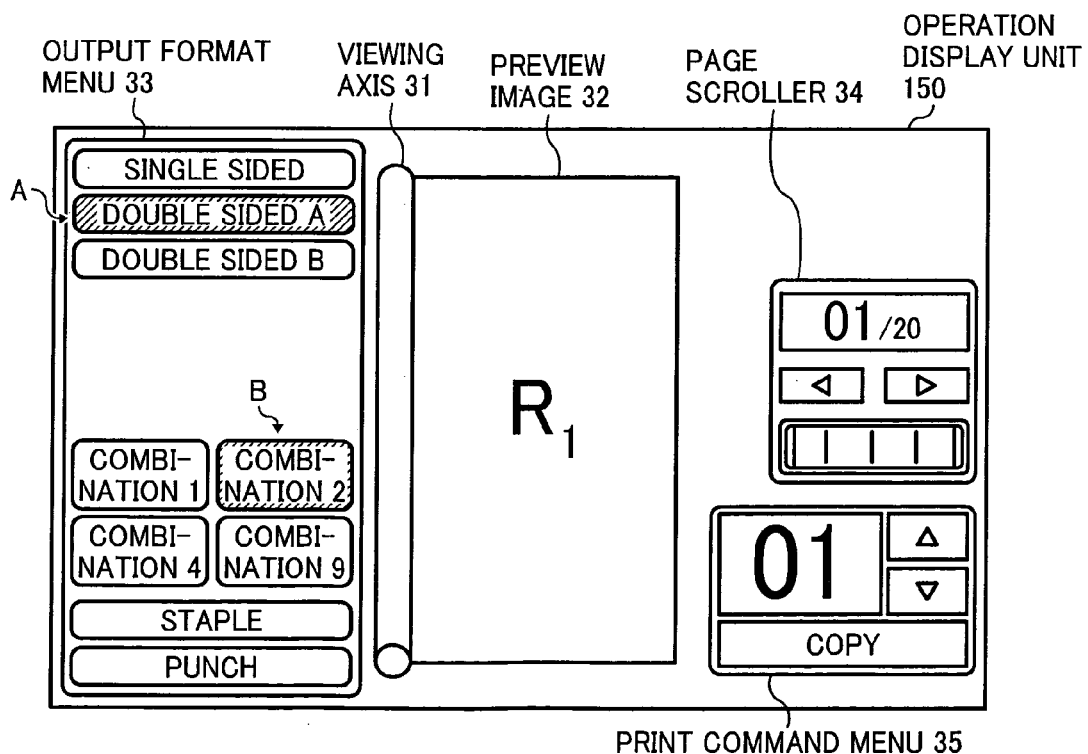
FIG. 13 is a schematic diagram for explaining one example of a display screen displayed on the operation display unit.

When determining that there is the input of the output format (YES at Step S1013), the operation display controller 151 obtains the output format (Step S1014). FIG. 13 is a schematic diagram for explaining one example of a display screen displayed on the operation display unit 150. For example, as shown in FIG. 13, by specifying "double sided A" and "combination 2" from the output format menu, "double sided A" and "combination 2" are obtained as the output format. The operation display controller 151 generates the screen data corresponding to the obtained output format (Step S1015). The operation display controller 151 displays the generated screen data on the operation display unit 150 (Step S1016). FIG. 14 is a schematic diagram for explaining one example of the display screen displayed on the operation display unit 150. For example, as shown in FIG. 14, the operation display controller 151 combines two pages of image data in one page as the preview image 32 corresponding to combination 2, to display the image data. The operation display controller 151 can display a change candidate of the position of the viewing axis (viewing axis candidate) 36.

Figure 16:
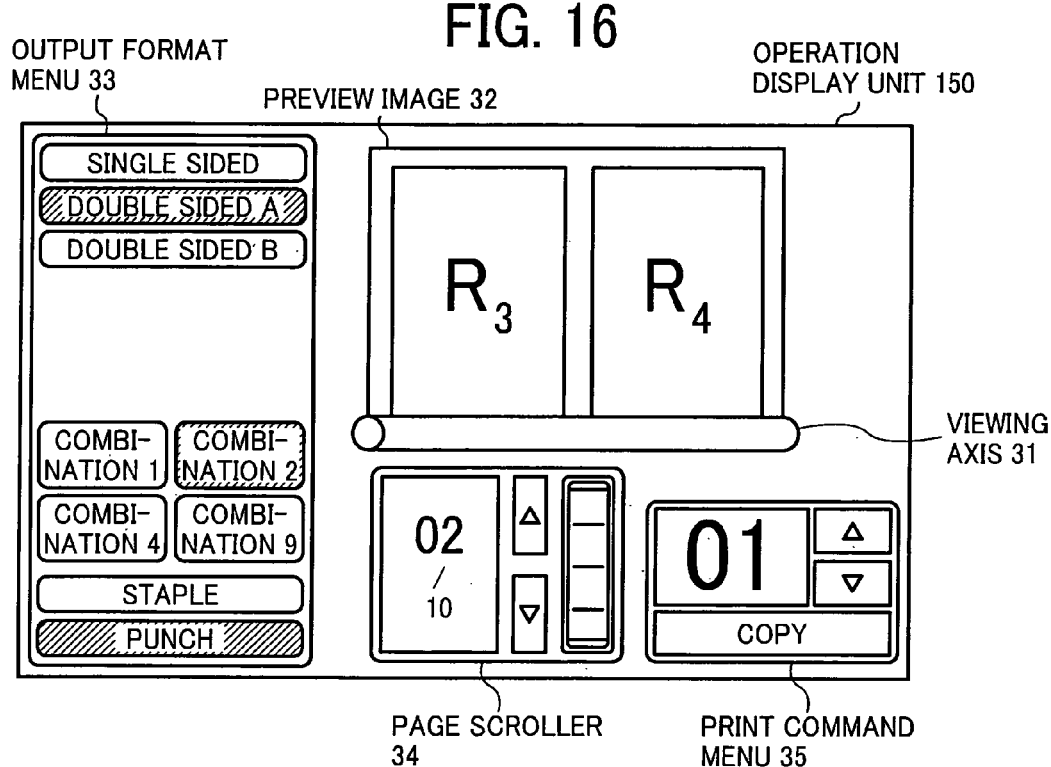
FIG. 16 is a schematic diagram for explaining one example of the display screen when the next page is specified.

The operation display controller 151 determines that the setting with respect to the image data has not finished yet (NO at Step S1017), and returns to Step S1008. The operation display controller 151 determines that the position of the viewing axis has been changed (YES at Step S1008), and receives the change of the position of the viewing axis according to the instruction on the preview image (Step S1009). The operation display controller 151 specifies the upper part of the preview image shown in FIG. 14 as the position of the viewing axis. The output-format menu generator 154 executes the output-format menu generating process (Step S1010). The output-format menu generator 154 obtains the setting item and the setting value when the position of the viewing axis is "top", and generates the output format menu corresponding to the obtained setting item. The operation display controller 151 generates the screen data (Step S1011), and displays the generated screen data on the operation display unit 150 (Step S1012). FIG. 15 is a schematic diagram for explaining one example of the display screen when the position of the viewing axis is changed. When the page scroller 34 on the display screen shown in FIG. 15 is specified and the next page is displayed, the screen is displayed as shown in FIG. 16. FIG. 16 is a schematic diagram for explaining one example of the display screen when the next page is specified.

Figure 17:
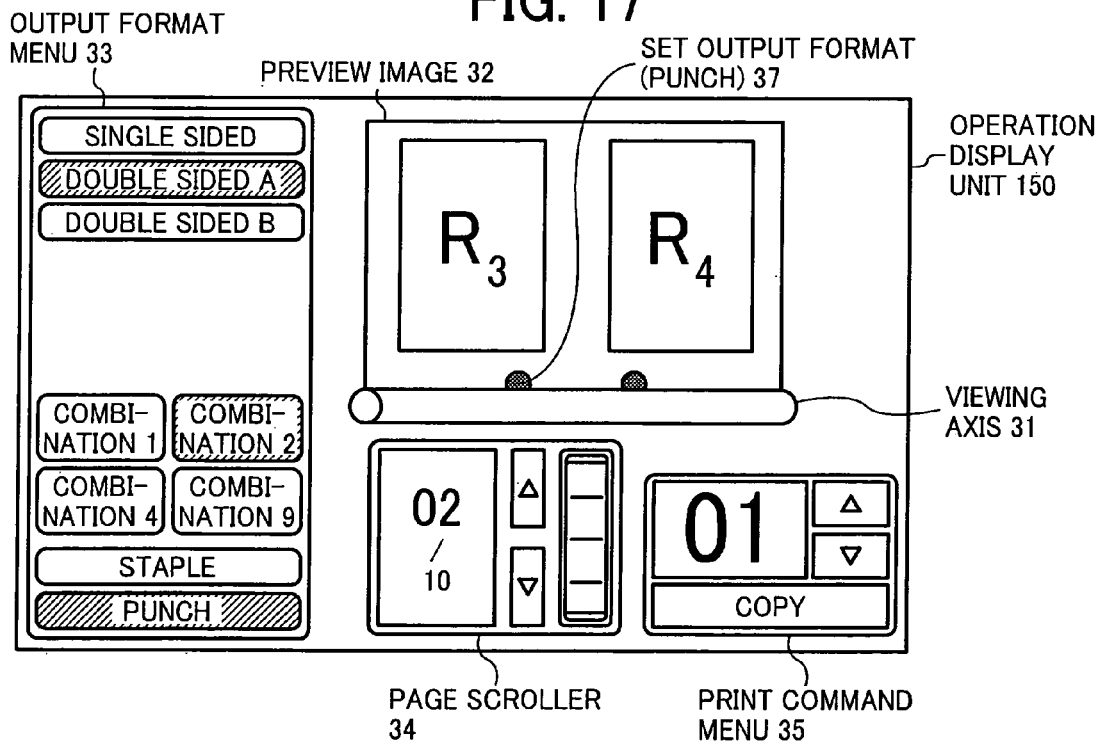
FIG. 17 is a schematic diagram for explaining one example of the display screen when punching is instructed.

The operation display controller 151 determines that there is an input of the output format (YES at Step S1013), and obtains the output format (Step S1014). In this case, punching is instructed and the setting item "punch" is obtained. The operation display controller 151 generates the screen data corresponding to the obtained output format (Step S1015). In this case, because the position of the viewing axis is "top", the upper part is selected without specifying the position of punching. The operation display controller 151 displays the generated screen data on the operation display unit 150 (Step S1016). FIG. 17 is a schematic diagram for explaining one example of the display screen when punching is instructed. As shown in FIG. 17, when not the top page but the middle page is displayed, punch holes are displayed at the position corresponding to the display.

The operation display controller 151 determines that the setting with respect to the image data has finished (YES at Step S1017), that is, when it is determined that printing is instructed, the image processor 130 processes the image data according to the set setting value (Step S1018). The image processor 130 stores the image-processed image data and the position of the viewing axis in the image storage unit 120 (Step S1019). The printer controller 142 outputs the image-processed image data from the printer 140 (Step S1020). The finishing processor 141 performs the finishing process with respect to the output print 2 (Step S1021). That is, two pages of the image data are combined in one page and double-sided printing is performed with respect to the print 2, and punching is executed.

A second embodiment of the present invention is explained next with reference to the accompanying drawings. Because the functions and the configuration of the MFP according to the second embodiment are substantially the same as those of the first embodiment, only parts different from the first embodiment will be explained. The MFP according to the second embodiment does not determine the position of the viewing axis based on the form information and the output format; however, receives an input of the position of the viewing axis by an instruction with respect to the preview image and limits the output format menu and the setting values corresponding to the input position of the viewing axis.

Figure 18:
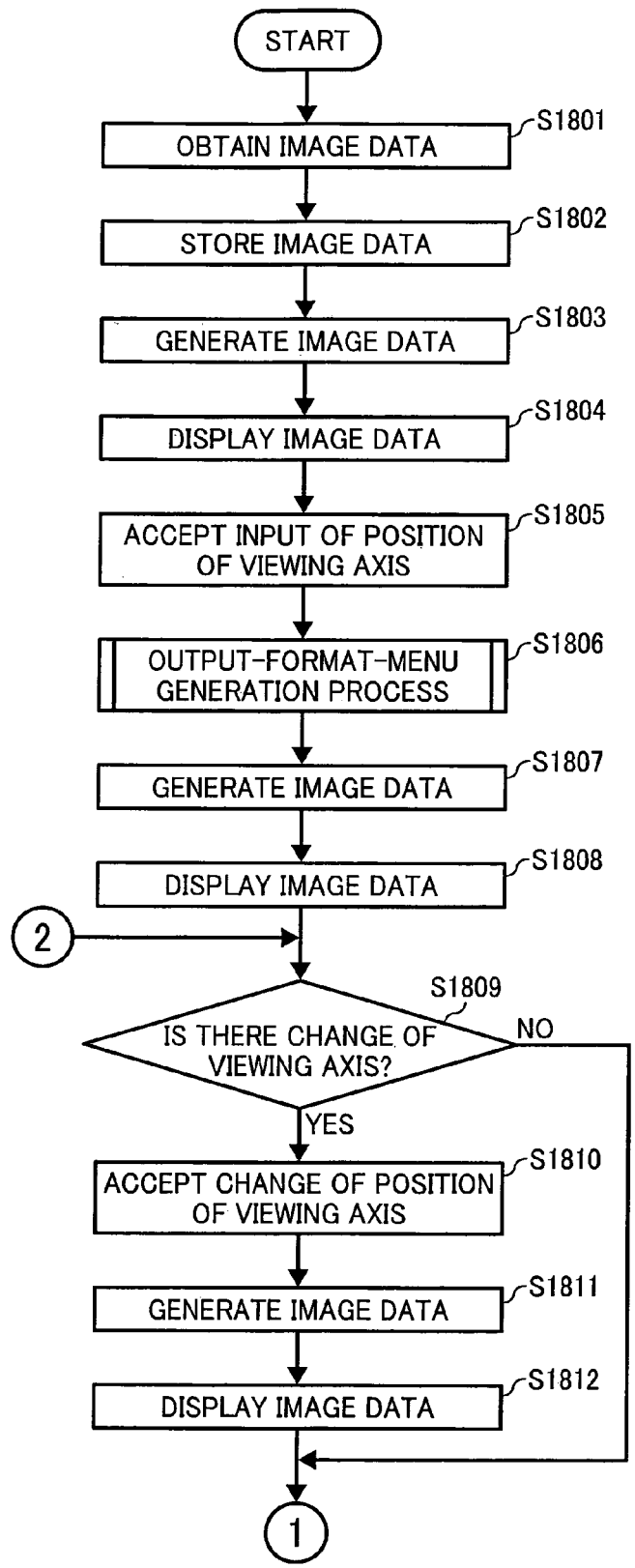
FIG. 18 is a flowchart of an output-format setting/output process procedure performed by a scanner, a form determining unit, a viewing-axis determining unit, an output-format menu generator, an operation display controller, a printer controller, and a finishing processor according to a second embodiment of the present invention.

A processing condition setting process performed by the MFP 100 according to the second embodiment is explained. FIG. 18 is a flowchart of the output-format setting/output process procedure performed by the scanner, the form determining unit, the viewing-axis determining unit, the output-format menu generator, the operation display controller, the printer controller, and the finishing processor according to the second embodiment. Because the output-format setting/output process procedure according to the second embodiment is substantially the same as the flowcharts shown in FIGS. 10A and 10B, only different parts will be explained. The process from Steps S1809 to Step S1812 refers to FIG. 10A and explanation thereof, the process after Step S1812 refers to FIG. 10B and explanation thereof, and explanations thereof will be omitted.

The scanner 110 reads the original document 1 to obtain the image data (Step S1801). The scanner 110 stores the obtained image data in the image storage unit 120 (Step S1802). The operation display controller 151 obtains the image data from the image storage unit 120 to generate the screen data from the obtained image data, output format menu, and the like (Step S1803). The operation display controller 151 displays the generated screen data on the operation display unit 150 (Step S1804).

The operation display controller 151 receives the input of the position of the viewing axis according to the instruction by the operation display unit 150 (Step S1805). The output-format menu generator 154 executes the output-format-menu generation process corresponding to the input position of the viewing axis (Step S1806). The operation display controller 151 generates the screen data including the preview image, the viewing axis, the output format menu, and the like generated based on the image data (Step S1807). The operation display controller 151 displays the generated screen data on the operation display unit 150 (Step S1808). The process thereafter refers to the explanation with reference to FIGS. 10A and 10B.

Thus, by inputting the position of the viewing axis by the user himself, the position of the viewing axis intended by the user can be set, and the output format limited to the position of the set viewing axis is displayed and specified. Accordingly, the output format intended by the user can be easily set.

A third embodiment of the present invention is explained with reference to the accompanying drawings. Because the functions and the configuration of the MFP according to the third embodiment are substantially the same as those of the first embodiment, only parts different from the first embodiment will be explained. The MFP according to the third embodiment obtains the image data stored in the storage unit and the position of the viewing axis, and limits the output format menu and the setting values corresponding to the obtained position of the viewing axis.

Figure 19:
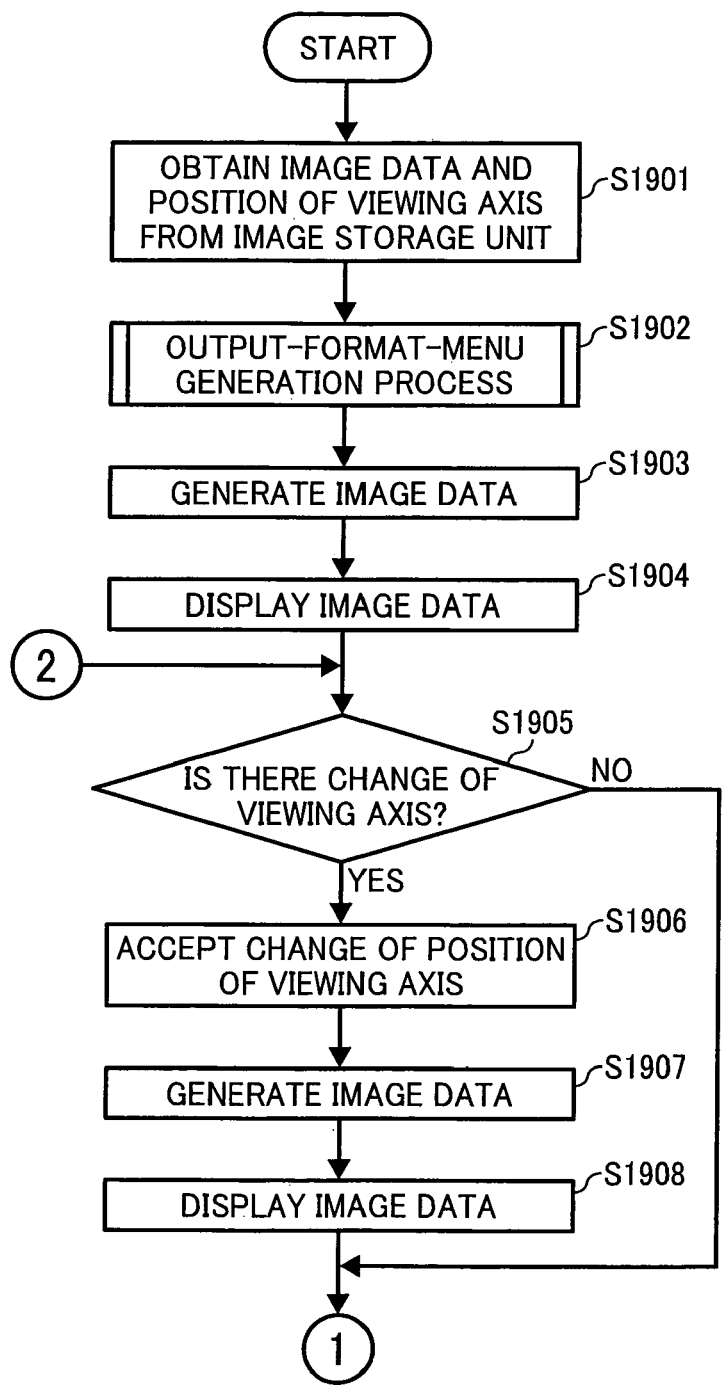
FIG. 19 is a flowchart of an output-format setting/output process procedure performed by a scanner, a form determining unit, a viewing-axis determining unit, an output-format menu generator, an operation display controller, a printer controller, and a finishing processor according to a third embodiment of the present invention.

The output-format setting/output process performed by the MFP 100 according to the third embodiment is explained. FIG. 19 is a flowchart of the output-format setting/output process procedure performed by the scanner, the form determining unit, the viewing-axis determining unit, the output-format menu generator, the operation display controller, the printer controller, and the finishing processor according to the third embodiment. Because the output-format setting/output process procedure according to the third embodiment is substantially the same as the flowcharts shown in FIGS. 10A and 10B, only different parts will be explained. The process from Steps S1905 to Step S1908 refers to FIG. 10A and explanation thereof, the process after Step S1908 refers to the FIG. 10B and explanation thereof, and explanations thereof will be omitted.

Figure 20:
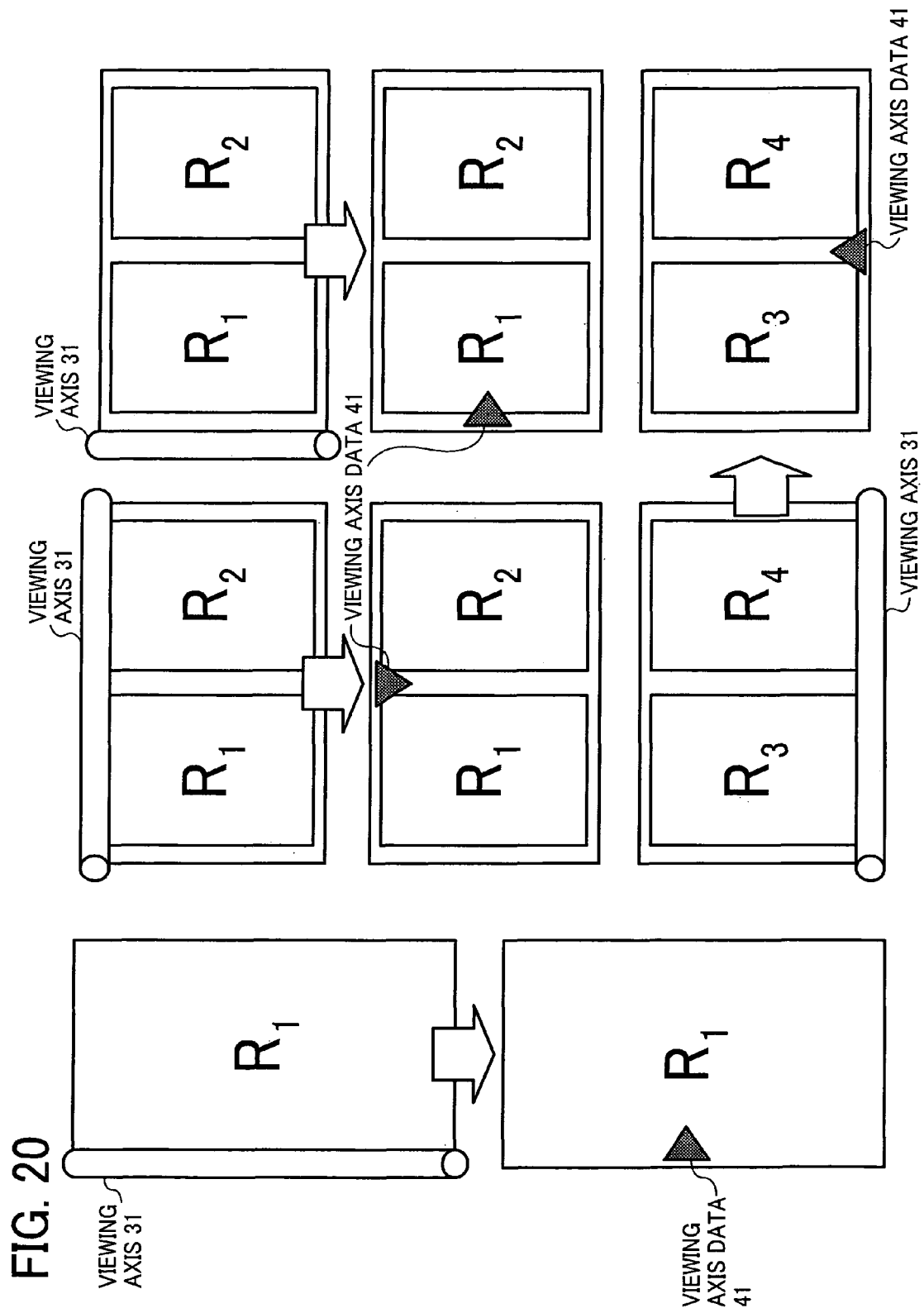
FIG. 20 is a schematic diagram for explaining an example in which a preview image displayed on the operation display unit and the viewing axis are embedded in image data.

The operation display controller 151 obtains the image data and the position of the viewing axis from the image storage unit 120 (Step S1901). FIGS. 20 and 21 are schematic diagrams for explaining of examples in which the preview image displayed on the operation display unit 150 and the viewing axis are embedded in the image data. As shown in FIG. 20 or 21, the position of the viewing axis is embedded in the image data or the preview image as the image. The position of the viewing axis can be stored in the image data as the character information. The output-format menu generator 154 executes the output-format-menu generation process corresponding to the obtained position of the viewing axis (Step S1902). The operation display controller 151 generates the screen data including the preview image, the position of the viewing axis, the output format menu, and the like generated based on the image data (Step S1903). The operation display controller 151 displays the generated screen data on the operation display unit 150 (Step S1904). The process thereafter refers to explanation with reference to FIGS. 10A and 10B.

Thus, when the position of the viewing axis is stored in the image data or the preview image, by generating the output format menu based on the stored position of the viewing axis, determination of the position of the viewing axis need not be performed, thereby enabling to reduce the processing time.

A fourth embodiment of the present invention is explained next with reference to the accompanying drawings. Because the functions and the configuration of the MFP according to the fourth embodiment are substantially the same as those in the first embodiment, only parts different from the first embodiment will be explained. The MFP according to the fourth embodiment obtains the image data stored in the storage unit and a document ID and limits the output format menu and the setting values corresponding to the position of the viewing axis stored in association with the obtained document ID.

The MFP according to the fourth embodiment includes a document information database in addition to the configuration of the first embodiment. The document information database stores the position of the viewing axis corresponding to the document ID. FIG. 22 is a schematic diagram for explaining one example of a data configuration of the document information database according to the fourth embodiment. The document information database stores the document ID in association with the position information of the viewing axis. The document ID here is information identifying the document including one or a plurality of pages of image data.

The output-format setting/output process performed by the MFP according to the fourth embodiment is explained. FIG. 23 is a flowchart of the output-format setting/output process procedure performed by the scanner, the form determining unit, the viewing-axis determining unit, the output-format menu generator, the operation display controller, the printer controller, and the finishing processor. Because the output-format setting/output process procedure according to the fourth embodiment is substantially the same as flowcharts shown in FIGS. 10A and 10B, only different parts will be explained. The process from Steps S2306 to Step S2309 refers to FIG. 10A and explanation thereof, the process after Step S2309 refers to FIG. 10B and explanation thereof, and explanations thereof will be omitted.

The operation display controller 151 obtains the image data and the document ID from the image storage unit 120 (Step S2301). The operation display controller 151 obtains the position of the viewing axis corresponding to the obtained document ID from the document information database (Step S2302). The output-format menu generator 154 executes the output-format-menu generation process corresponding to the obtained position of the viewing axis (Step S2303). The operation display controller 151 generates the screen data including the preview image, the position of the viewing axis, the output format menu, and the like generated based on the image data (Step S2304). The operation display controller 151 displays the generated screen data on the operation display unit 150 (Step S2305). The process thereafter refers to the explanation with reference to FIGS. 10A and 10B.

Thus, by storing the position of the viewing axis for each document and generating the output format menu corresponding to the stored position of the viewing axis, determination of the position of the viewing axis need not be performed based on the image data, thereby enabling to reduce the processing time.

In the first to fourth embodiments, the MFP 100 is applied as the image processing apparatus of the present invention; however, the present invention is not limited thereto. For example, the image forming apparatus such as a printer is connected to a personal computer (PC), and a predetermined program is installed in the storage unit such as a hard disk drive (HDD) of the PC to operate a central processing unit (CPU) of the PC according to the program, thereby enabling to obtain the same action and effects as those described above.

Figure 24:
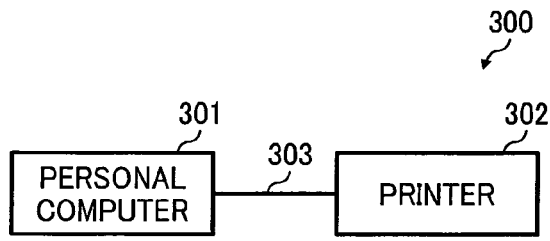
FIG. 24 is a schematic block diagram of a configuration example of a printing system according to a fifth embodiment of the present invention.

FIG. 24 is a schematic block diagram of a configuration example of a printing system 300 according to a fifth embodiment of the present invention. The printing system 300 shown in FIG. 24 is formed by connecting a PC 301 that transmits the image data and a print job including the output format for printing the image data with a printer 302 that prints the image data via a cable 303.

The PC 301 transmits the image data corresponding to the created document and the output format data (sheet direction, double-sided, combination, binding, staple, punch, and enlarge/reduce) set for printing the document as the print job to the printer 302.

The printer 302 prints the image data according to the print job transmitted from the PC 301. Specifically, the printer 302 prints the image data included in the print job on the media such as paper, according to the output format data (sheet direction, double-sided, combination, binding, staple, punch, and enlarge/reduce) included in the print job.

Specific configurations of the PC 301 and the printer 302 are explained in this order.

Figure 25:
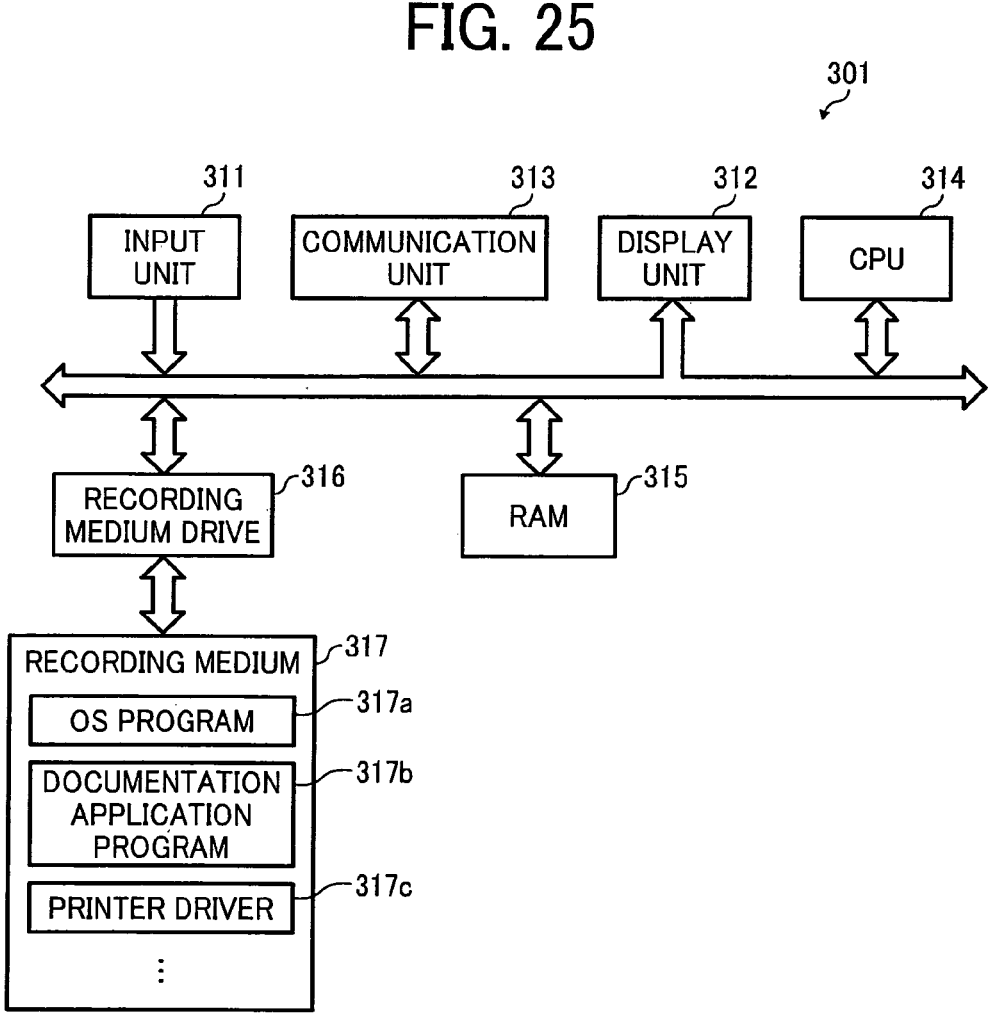
FIG. 25 is a schematic block diagram of a PC.

FIG. 25 is a schematic block diagram of the PC 301. In FIG. 25, the PC 301 includes an input unit 311 for inputting the data, a display unit 312, a communication unit 313 that performs data communication, a CPU 314 that controls the entire apparatus, a RAM 315 used as a work area of the CPU 314, a recording medium drive 316 that reads/writes the data in a recording medium 317, and the recording medium 317 that stores various programs and the like for operating the CPU 314.

The input unit 311 includes a keyboard including a cursor key, a numeric input key and various function keys, and a mouse, a slice pad, or the like for selection of the key on the display screen of the display unit 312. The input unit 311 is a user interface with which the user gives an operation instruction to the CPU 314 or inputs the data.

The display unit 312 includes a cathode ray tube (CRT), a liquid crystal display (LCD), or the like, and performs display corresponding to the display data input from the CPU 314. The communication unit 313 is for performing data communication with an external device, and for example, for performing the data communication with the printer 302 or the like via the cable 303.

The CPU 314 is a central control unit that controls the entire device according to the program stored on the recording medium 317. The input unit 311, the display unit 312, the communication unit 313, the RAM 315, and the recording medium drive 316 are connected to the CPU 314. The CPU 314 controls the data communication, read of an application program via an access to the memory, read/write of various data, input of data/command, display, and the like. The CPU 314 transmits the image data input from the input unit 311 and printing condition data of the image data to the printer 302 as the print job via the communication unit 313.

The RAM 315 includes a work memory that stores the specified program, the input command, the input data, a processing result, and the like, and a display memory that temporarily stores display data to be displayed on the display screen of the display unit 312.

The recording medium 317 stores various programs and data such as an OS program 317a executable by the CPU 314 (for example, WINDOWS® or the like), a documentation application program 317b, and a printer driver 317c corresponding to the printer 302. As the recording medium 317, for example, an optical, magnetic, or electrical recording medium such as an FD, a hard disk (HD), a CD-ROM, a DVD-ROM, a magneto-optical (MO) disk, and a personal computer (PC) card can be used. The various programs are stored on the recording medium 317 in a data format readable by the CPU 314. The various programs can be stored on the recording medium beforehand, or can be downloaded via the communication line and stored on the recording medium. Further, the various programs can be distributed via the communication line.

Figure 26:
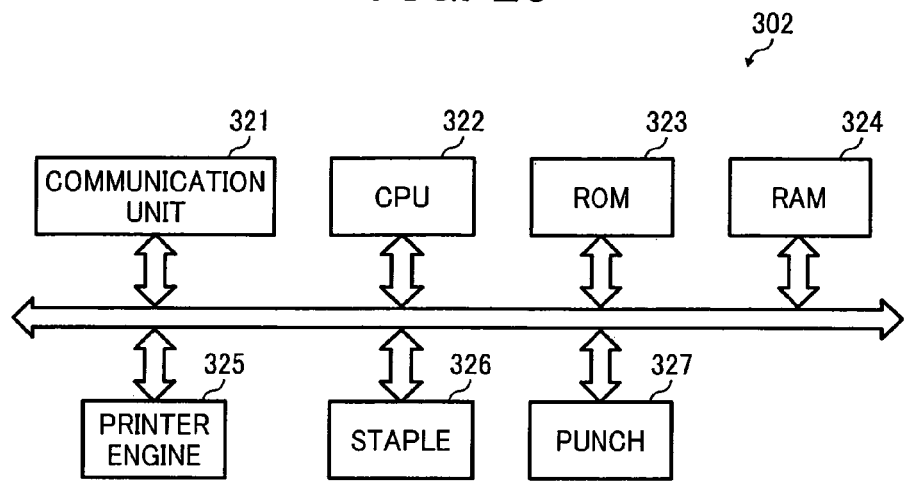
FIG. 26 is a schematic block diagram of a printer.

FIG. 26 is a schematic block diagram of the printer 302. As shown in FIG. 26, the printer 302 includes a communication unit 321 that performs the data communication, a CPU 322 that controls the entire printer 302, a ROM 323 that stores various control programs for operating the CPU 322, a RAM 324 that temporarily stores the work area of the various control programs, print data of the print job input from the PC 301 or the like, and the output format data, a printer engine 325 for printing the print data on a transfer sheet, a staple 326 for stapling the sheet on which the print data is printed, and a punch 327 for punching the transfer sheet on which the print data is printed. That is, the printer 302 includes a double-sided function, a punching function, and a stapling function.

The communication unit 321 performs the data communication with the external device, and for example, performs the data communication with the PC 301.

The CPU 322 controls the entire apparatus according to the various control programs stored in the ROM 323. The communication unit 321, the ROM 323, the RAM 324, the printer engine 325, the staple 326, and the punch 327 are connected to the CPU 322, and the CPU controls the data communication, the printer operation, and the like.

The ROM 323 stores the various control programs for operating the CPU 322, a parameter used for the process, and the like. The RAM 324 includes a work memory that stores the specified control program, the processing result, the received image data, and the like.

The printer engine 325 is an electrographic printer engine, and prints the print data on the transfer sheet. As the printing method of the printer 302, various methods can be used such as the ink jet method, the sublimation dye transfer printing method, the silver salt photographic method, the direct thermal recording method, and the thermofusible transfer method, other than the electrophotographic method.

The printer driver 317c of the PC 301 is explained next. The printer driver 317c is a software program designed so that other programs can be operated with respect to a specific program without being annoyed with hardware or an internal "language" of the printer 302. The printer driver 317c is for controlling the printer 302, and performing processing of the output data and the like.

The CPU 314 of the PC 301 generates and displays a finishing rendering based on the image data input from the input unit 311 and the output format data of the image data, and transfers the image data created by the documentation application program 317b to the printer 302.

Figure 27:
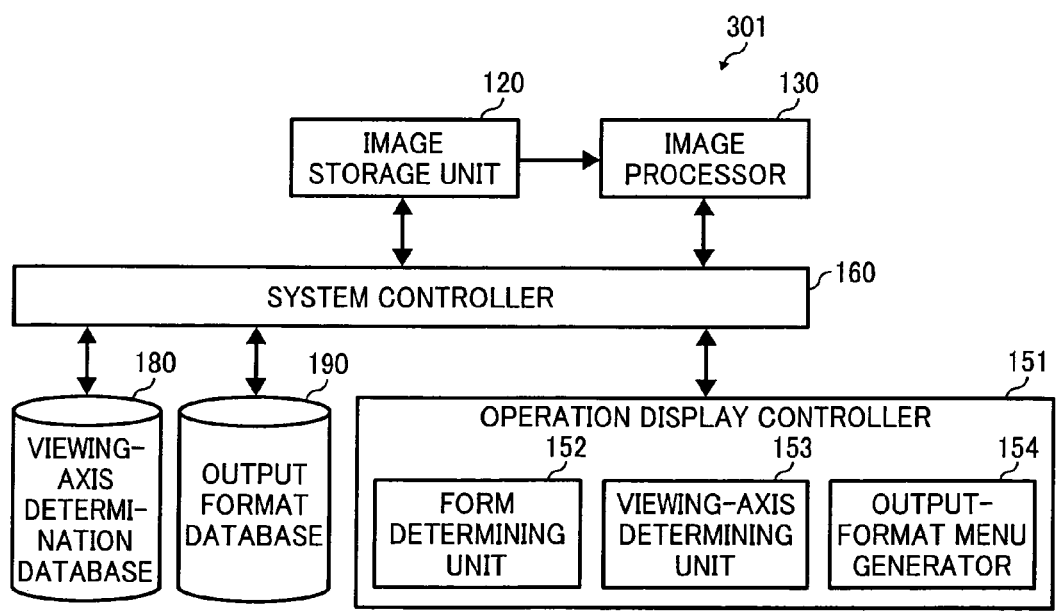
FIG. 27 is a block diagram of relevant parts of the PC.

FIG. 27 is a block diagram of relevant parts of the personal computer. The PC 301 includes, as shown in FIG. 27, the image storage unit 120, the image processor 130, the operation display controller 151, the form determining unit 152, the viewing-axis determining unit 153, the output-format menu generator 154, the system controller 160, the viewing-axis determination database 180, and the output format database 190, by operating the CPU 314 according to the printer driver 317c.

Thus, the PC 301 includes the same system configuration as the MFP 100 shown in FIG. 1, by operating the CPU 314 according to the printer driver 317c, thereby enabling to obtain the same action and effects as those explained in the first to fourth embodiments.

Figure 28:
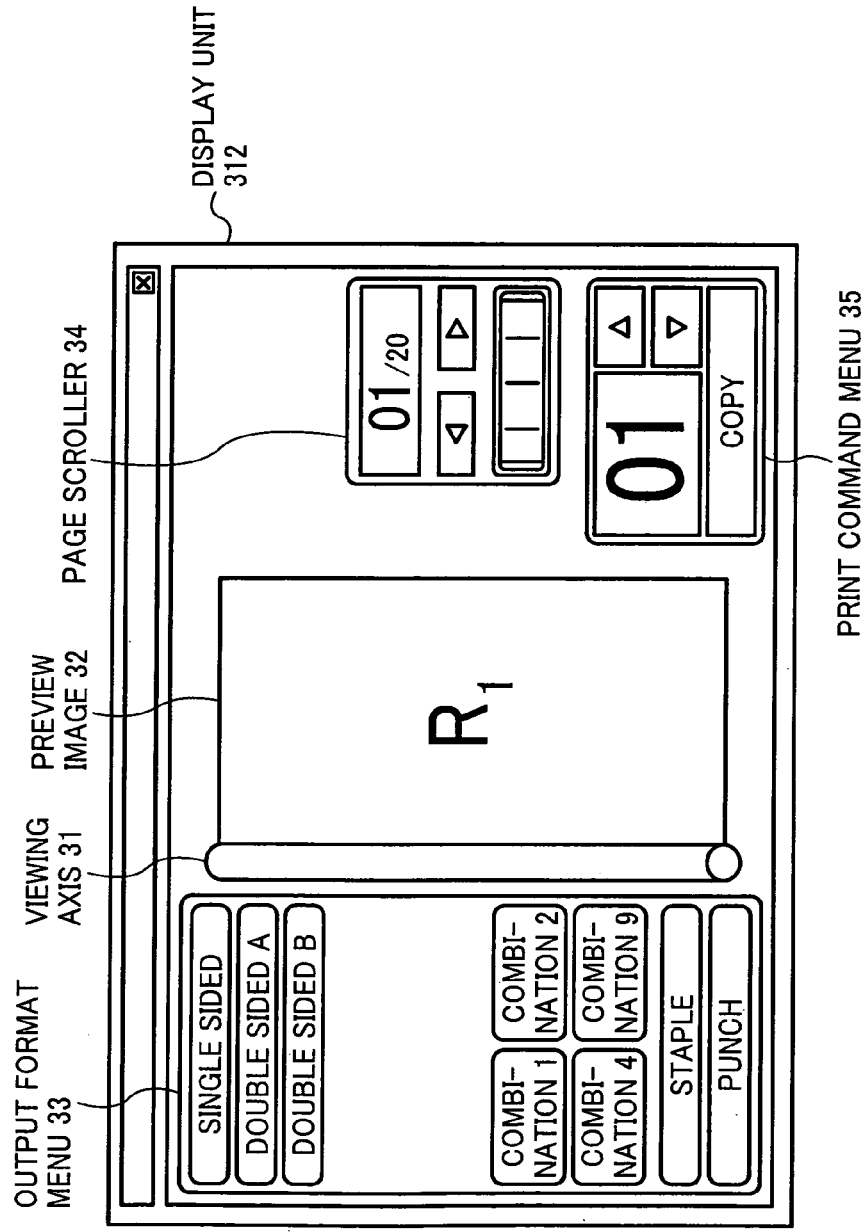
FIG. 28 is a schematic diagram for explaining one example of a display screen by a printer driver.

FIG. 28 is a schematic diagram for explaining one example of the display screen by the printer driver 317c. The screen shown in FIG. 28 is a display screen of the documentation application program 317b, a startup screen of the OS program 317a, or the like, which is displayed when startup of the printer driver 317c is selected. As shown in FIG. 28, the display screen for generating and displaying the image data input from the input unit 311 and the preview image based on the output format data of the image data is displayed on the display unit 312 (the same as the operation display screen of the MFP 100).

In the fifth embodiment, the operation display screen for generating and displaying the finishing rendering based on the image data input from the input unit 311 and the output format data of the image data is displayed by operating the CPU 314 according to the printer driver 317c; however, the present invention is not limited thereto, and the operation display screen can be displayed by operating the CPU 314 of the PC 301 according to the documentation application program 317b or the OS program 317a.

As described above, according to an aspect of the present invention, because the output format for the image information can be selected from the format information narrowed down based on the position of the viewing axis, the output format can be easily set for the image information.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   at least one processor configured to operate a plurality of units, the plurality of units including,
      an image-information obtaining unit that obtains image information;
      a form determining unit that determines form information indicating a characteristic for limiting a position of a viewing axis based on the image information obtained by the image-information obtaining unit, the viewing axis being an axis for turning over a page of a medium on which the image information is printed;
      a viewing-axis determining unit that determines the position of the viewing axis based on the form information determined by the form determining unit;
      a format limiting unit that limits format information that can be set according to the position of the viewing axis determined by the viewing-axis determining unit; and
      a format receiving unit that receives an input of the format information limited by the format limiting unit, wherein
         the form information determined by the form determining unit includes at least one of line information indicating whether characters included in the image information are written in vertical or horizontal direction, and top and bottom information indicating whether top and bottom are same or reversed in an odd page and an even page when double-sided printing is performed.

2. The image processing apparatus according to claim 1, wherein the plurality of units further includes a format storage unit that stores therein the format information in association with the position of the viewing axis, wherein the format limiting unit obtains the format information associated with the position of the viewing axis determined by the viewing-axis determining unit from the format storage unit, and limits the format information to obtained format information.

3. The image processing apparatus according to claim 1, wherein the format information received by the format receiving unit includes at least one of print information indicating whether double-sided or single-sided printing of the image information is to be performed at a time of printing the image information and binding direction information indicating a direction of binding a print.

4. The image processing apparatus according to claim 1, wherein the viewing-axis determining unit determines the position of the viewing axis based on the format information received by the format receiving unit, as well as the form information.

5. The image processing apparatus according to claim 1, wherein the viewing-axis determining unit determines the position of the viewing axis based on a part of the format information received by the format receiving unit, as well as the form information.

6. The image processing apparatus according to claim 1, wherein the position of the viewing axis determined by the viewing-axis determining unit is any one of upper left, upper right, left end, right end, and top end of the print on which the image information is printed in an upright direction.

7. The image forming apparatus of claim 1 further comprising:
a printing unit that prints the image information on the medium based on the format information.

8. An image processing apparatus comprising:
at least one processor configured to operate a plurality of units, the plurality of units including,
an image-information obtaining unit that obtains image information;
a form determining unit that determines form information, the form information including at least one of line information indicating whether characters included in the image information are written in vertical or horizontal direction, and top and bottom information indicating whether top and bottom are same or reversed in an odd page and an even page when double-sided printing is performed;
an image display unit that displays the image information obtained by the image-information obtaining unit;
a viewing-axis receiving unit that receives an input of a position of a viewing axis that is an axis for turning over a page of a print on which the image data is printed with respect to the image information displayed by the image display unit;
a format limiting unit that limits format information that can be set according to the position of the viewing axis received by the viewing-axis receiving unit; and
a format receiving unit that receives an input of the format information limited by the format limiting unit.

9. The image processing apparatus according to claim 8, wherein the position of the viewing axis determined by the viewing-axis determining unit is any one of upper left, upper right, left end, right end, and top end of a print on which the image information is printed in an upright direction.

10. The image forming apparatus of claim 8, further comprising:
a printing unit that prints the image information on the medium based on the format information.

11. An output-format setting method by at least one processor comprising:
obtaining, by the at least one processor, image information;
determining, by the at least one processor, form information indicating a characteristic of limiting a position of a viewing axis based on the obtained image information, the viewing axis being an axis for turning over a page of a medium on which the image information is printed, the form information including at least one of line information indicating whether characters included in the image information are written in vertical or horizontal direction, and top and bottom information indicating whether top and bottom are same or reversed in an odd page and an even page when double-sided printing is performed;
determining, by the at least one processor, the position of the viewing axis based on the determined form information;
obtaining, by the at least one processor, format information associated with the determined position of the viewing axis from a format storage unit that stores therein the format information in association with the position of the viewing axis, and limiting the format information to the obtained format information; and
receiving, by the at least one processor, an input of the limited format information.

12. The output-format setting method according to claim 11, wherein the format information includes at least one of print information indicating whether double-sided or single-sided printing of the image information is to be performed at a time of printing the image information and binding direction information indicating a direction of binding a print.

13. The output-format setting method according to claim 11, wherein the determining the position of the viewing axis step further includes determining the position of the viewing axis based on the received format information and the form information.

14. The output-format setting method according to claim 11, wherein the position of the viewing axis step further includes determining the position of the viewing axis based on a part of the received format information and the form information.

15. The output-format setting method according to claim 11, further comprising:
displaying, by at least one processor, the viewing axis on the obtained image information.

16. The output-format setting method according to claim 15, further comprising:
changing, by the at least one processor, the position of the viewing axis displayed at the displaying step by instructing a new position, wherein the format information is limited according to the new position of the viewing axis.

17. The output-format setting method according to claim 11, wherein the position of the viewing axis is any one of upper left, upper right, left end, right end, and top end of a print on which the image information is printed in an upright direction.

* * * * *